(12) United States Patent
Saso et al.

(10) Patent No.: US 6,899,351 B2
(45) Date of Patent: May 31, 2005

(54) GAS GENERATOR

(75) Inventors: Takashi Saso, Hyogo (JP); Fujio Tanabe, Hyogo (JP); Koji Tanaka, Hyogo (JP)

(73) Assignee: Nippon Kayaku Kabushiki-Kaisha, Tokyo (JP)

( * ) Notice: Subject to any disclaimer, the term of this patent is extended or adjusted under 35 U.S.C. 154(b) by 0 days.

(21) Appl. No.: 10/221,676
(22) PCT Filed: Mar. 12, 2001
(86) PCT No.: PCT/JP01/01895
§ 371 (c)(1), (2), (4) Date: Sep. 13, 2002
(87) PCT Pub. No.: WO01/68415
PCT Pub. Date: Sep. 20, 2001

(65) Prior Publication Data
US 2003/0030259 A1 Feb. 13, 2003

(30) Foreign Application Priority Data

Mar. 13, 2000 (JP) .................... 2000-067986
Aug. 25, 2000 (JP) .................... 2000-254976

(51) Int. Cl.⁷ ............................................. B60R 21/26
(52) U.S. Cl. ....................................... 280/736; 280/741
(58) Field of Search ................................ 280/736, 741

(56) References Cited

U.S. PATENT DOCUMENTS

| 4,698,107 A | * 10/1987 | Goetz et al. ............... 149/7 |
| 5,468,017 A | * 11/1995 | Kirsch et al. ............. 280/741 |
| 5,499,843 A | * 3/1996 | Faigle et al. ............. 280/741 |
| 5,501,487 A | * 3/1996 | Trevillyan et al. ......... 280/736 |
| 5,582,427 A | * 12/1996 | Rink et al. ............... 280/740 |
| 5,622,380 A | 4/1997 | Khandhadia et al. |
| 5,683,104 A | * 11/1997 | Smith ..................... 280/736 |
| 5,806,885 A | * 9/1998 | Hock ..................... 280/737 |
| 5,851,027 A | * 12/1998 | DiGiacomo et al. ......... 280/736 |
| 6,032,979 A | * 3/2000 | Mossi et al. .............. 280/741 |
| 6,142,515 A | * 11/2000 | Mika ..................... 280/736 |
| 6,189,924 B1 | * 2/2001 | Hock ..................... 280/736 |
| 6,669,230 B1 | * 12/2003 | Nakashima et al. ......... 280/735 |
| 2001/0001523 A1 | * 5/2001 | Green et al. .............. 280/736 |

FOREIGN PATENT DOCUMENTS

| EP | 0 879 739 | 11/1998 |
| JP | 3-112454 | 11/1991 |
| JP | 6-27379 | 4/1994 |
| JP | 7-232613 | 9/1995 |
| JP | 3040049 | 5/1997 |
| JP | 9-183359 | 7/1997 |
| JP | 9-220424 | 8/1997 |
| JP | 10-53093 | 2/1998 |
| JP | 11034788 A | * 2/1999 |
| JP | 11-59318 | 3/1999 |
| JP | 11091495 A | * 4/1999 |
| JP | 11-189125 | 7/1999 |

* cited by examiner

*Primary Examiner*—Ruth Ian
(74) *Attorney, Agent, or Firm*—Oblon, Spivak, McClelland, Maier & Neustadt, P.C.

(57) ABSTRACT

The present invention provides a gas generator for expanding and inflating a driver's seat airbag. The gas generator comprises two ignitor device 8, 9 for burning gas generants 7 packed in combustion chambers 3, 4, and enhancer device 10, 11 for allowing the flames from the ignitor device 8, 9 to be propagated circumferentially and radially of a housing 1.

14 Claims, 23 Drawing Sheets

GAS GENERATOR

TECHNICAL FIELD

The present invention relates to a gas generator used to expand and inflate an airbag system of a vehicle.

BACKGROUND ART

A gas generator that works to expand and inflate the airbag rapidly to protect a vehicle occupant from the impact at a car collision is built in an airbag module mounted in a steering wheel and the like. The gas generator generates a large amount of gas rapidly by burning the gas generants by flames of ignitor device ignited by the application of electric power.

The conventional gas generator has the mode of expanding and inflating the airbag rapidly at any time that the car collision happens, irrespective of a seating position of a vehicle occupant (a normal seating position or an abnormal seating position such as a stoop-shouldered position, etc.). This may cause the problem that when the vehicle occupant takes the abnormal seating position in proximity of the steering wheel and the like, the airbag cannot serve its original function of protecting the vehicle occupant.

For solving this problem, there has been proposed and developed the so-called soft inflation technique which is applied to the gas generator used for expanding and inflating the passenger's airbag. The proposed gas generator is so designed that an elongated cylindrical housing is partitioned into two combustion chambers and also the gas generants in the respective combustion chambers are burnt independently of each other by the two ignitor devices. The ignitor devices are fixed to the housing at both axial ends thereof.

The ignitor devices are operated in such a time difference that, in the initial stage of inflation, the airbag is expanded and inflated moderately by a small amount of gas generated from a first combustion chamber and then is expanded and inflated rapidly by a large amount of gas generated in the respective combustion chambers. This can provide a controlled expansion and inflation of the airbag.
It is conceivable that this soft Inflation technique is applied to the gas generator used to expand and inflate the driver's seat airbag.

As the gas generator for the driver's seat airbag is usually built in a narrow space of the steering wheel, it is required to have a short cylindrical housing. In addition, as the airbag is also mounted in that narrow space of the steering wheel, the airbag is required so as to cover the housing of the gas generator at one axial end thereof. For this reason, the gas generator for the driver's seat airbag adopts the structure that the ignitor device is mounted in the housing at the other axial end thereof to be in the opposite side to the airbag.

As a result of this, when the soft inflation technique is applied to the gas generator for the driver's seat airbag, the gas generator for the driver's seat airbag adopts the structure that the housing is partitioned into two combustion chambers and also two ignitor devices are mounted in the housing at the other axial end thereof. In this structure, when the ignitor devices are energized to ignite with an adequate time difference, the airbag is expanded and inflated moderately by a small amount of gas generated from the first combustion chamber in the initial state of inflation and then expanded and inflated rapidly by a large amount of gas generated in the respective combustion chambers.

In the application of the soft inflation technique to the gas generator for the driver's seat airbag, one or two or more of the ignitor devices must be offset from the axis of the housing in order to be mounted in the housing at the other end thereof.

As a result of this, local combustion stemming from the eccentrically disposed ignitor device is produced in the combustion chamber in which the eccentrically disposed ignitor device is/are fitted. This causes possible problems that the gas cannot be uniformly generated all around the circumference of the housing and thus cannot be uniformly discharged into the airbag, then leading to the partial expansion and inflation of the airbag, and as such may spoil the original function of the airbag of protecting the vehicle occupant.

It is the object of the present invention to provide a gas generator that enables flames of the ignitor device to be propagated in the circumferential direction and radial direction of the housing via enhancer device, so as to instantaneously transfer the burning of the gas generants to the collective burning of the same, whereby the generated gas is uniformly discharged into the airbag.

DISCLOSURE OF THE INVENTION

A gas generator of the present invention comprises at least one of a plurality of ignitor devices is eccentrically disposed with respect to an axis of the housing and the enhancer devices for allowing the flame of the ignitor device disposed on the eccentric position to be propagated circumferentially and radially of the housing.

According to the above gas generator, the combustion in the housing broadens all over the whole of gas generants instantaneously by the flames spouted from the each ignitor directly and the flames propagated by the enhancer device. Consequently, there is no partial combustion which occurs in the vicinity of the ignitor eccentrically disposed in the housing. The gas can be uniformly generated all over the inside of the housing.

Further in case that a plurality of ignitor devices ignite by an electric current with very small time (hereinafter, minute time) delay among of them, a multi-level expansion control can be provided, wherein an airbag is moderately expanded and inflated by a small amount of generated gas in the initial stage and then rapidly expanded and inflated by a large amount of gas.

Another gas generator of the present invention, comprises at least one of a plurality of ignitor devices eccentrically disposed with respect to an axis of the housing and enhancer devices for allowing, at least, the flame of the ignitor device disposed on the eccentric position to be propagated circumferentially and radially of the housing. The enhancer devices burn the gas generants packed in a plurality of combustion chambers respectively and independently.

According to the above gas generator, the combustion in the each combustion chamber broadens all over the whole of gas generants instantaneously by the flames spouted from the each ignitor directly and the flames propagated by the enhancer device. Consequently, there is no partial combustion which occurs in the vicinity of the ignitor eccentrically disposed in the each combustion chamber. The gas can be uniformly generated all over the inside of the housing.

In addition, in case that a plurality of ignitor devices ignite by an electric current with minute time delay among of them, a multi-level expansion control can be provided, wherein an airbag is moderately expanded and inflated by a small amount of gas generated in one combustion chamber in the initial stage, and then rapidly expanded and inflated by a large amount of gas generated in all combustion chambers.

In the present invention, a gas generator may be adopted, which comprises a short cylindrical housing, a partition plate for partitioning the interior of the housing into two upper and lower combustion chambers, filter fitted in the respective combustion chambers, gas generants charged in the inside of the respective filters, two ignitor devices for burning the gas generants packed in the combustion chambers respectively and two enhancer devices for propagating the flames from the ignitor devices In the combustion chambers respectively.

Also, in the present invention, a housing may be adopted, which has a double cylinder structure or a single cylinder structure. In the double cylinder structure, top ends and bottom ends of the outer cylinder and the inner cylinder are closed by two cover plates. In the single cylinder structure, top and bottom ends of the outer cylinder are closed by two cover plates.

In the gas generator of the present invention, the enhancer devices are respectively provided in the plurality of combustion chambers so as to extend circumferentially and radially of the housing, so as to be respectively in direct or Indirect contact with the gas generants in the combustion chambers and so as to be ignited by the flames spouted from the ignitor devices.

According to the above gas generator, the respective enhancer devices can be ignited by the flames spouted from the ignitor device. The flames are propagated through the enhancer devices in the circumferential direction and the radial direction of the housing and then the gas generants in contact with the enhancer devices are burned. Thereby, the combustion in the respective combustion chambers broadens all over the whole of the gas generants instantaneously. And in the present invention, an enhancer device may be adopted, which is made of enhancer agents and formed into a disk-shaped plate or a ring-shaped plate. In this case, the enhancer agents contact with the gas generants directly. Also, in the present invention, another enhancer device may be adopted, in which enhancer agents are charged in an enhancing groove of the ring partition plate and the enhancing groove is tightly sealed so as to be integrated with enhancer agents. In this case, the enhancer agents contact with the gas generants indirectly.

In the gas generator of the present invention, the enhancer device comprises an enhancing space opening in the combustion chamber and extending circumferentially and radially of the housing so as to be spouted the flames from the ignitor device into.

According to the above gas generator, the flames of the ignitor device are propagated in the circumferential direction and the radial direction of the housing along the enhancing space, whereby the combustion in the respective combustion chambers broadens all over the whole of the gas generants instantaneously.

In the gas generator of the present invention, the enhancing space is closed by a cushioning member disposed in the respective combustion chambers. The cushioning member has a plurality of enhancing holes arranged along the enhancing space so that enhancing space can open toward the combustion chamber.

According to the above gas generator, the flames of the ignitor device are propagated in the circumferential direction and the radial direction of the housing along the enhancing space and spouted through the enhancing holes to the combustion chamber, whereby the combustion in the respective combustion chambers broadens all over the whole of the gas generants instantaneously.

And, since the cushioning member is mounted in the each combustion chamber so as to close the enhancing space, the gas generants are prevented from being powdered by vibration and entering the enhancing space.

In the gas generator of the present invention, the enhancer device comprises enhancer agents containing auto-ignition explosive composition. According to the above gas generator, the enhancer device is automatically ignited by the flames and heat spouted from the ignitor device and the flames are propagated in the circumferential direction and radial direction of the housing.

A gas generator of the present invention, comprises a cylindrical housing, an ignitor device for burning the gas generants in the housing and an enhancer device for allowing the flames from the ignitor device to be propagated in the circumferential direction and the radial direction of the housing so as to burn the gas generants in the housing.

Now, the soft inflation technique as mentioned above is adequately selected in accordance with the vehicle use pattern. The above gas generator in which the gas generants packed in the housing can be burnt by using a single ignitor device, is not included in the soft inflation technique. Also, the housing adopted includes not only a single cylinder structure but also a multiple cylinder structure including a double cylinder structure and a triple cylinder structure. In these type of gas generator as well, there is the possibility that the partial combustion of the gas generants may be caused in the housing and then the airbag may be partially expanded and inflated. In view of this, the gas generator of the present invention adopts the structure so that the flames from the ignitor device may be propagated in the circumferential direction and the radial direction of the housing by the enhancer device.

Thereby, the combustion in the housing broadens all over the whole of gas generants instantaneously by the flames spouted from the ignitor directly and the flames propagated by the enhancer device. Therefore, the gas discharged into the airbag can be uniformed.

A gas generator of the present invention, comprises an enhancer device provided in the combustion chamber of the cylindrical housing so that the flames from the ignitor device may be propagated circumferentially and radially of the combustion chambers and so as to burn the gas generants in the combustion chamber.

Now, the soft inflation technique as mentioned above is adequately selected in accordance with the vehicle use pattern. The above gas generator in which the gas generants packed in the combustion chamber can be burnt by using a single ignitor device, is not included in the soft inflation technique. Also, the housing adopted includes not only a single cylinder structure but also a multiple cylinder structure including a double cylinder structure and a triple cylinder structure. In these type of gas generator as well, there is the possibility that the partial combustion of the gas generants may be caused in the housing and then the airbag may be partially expanded and inflated. In view of this, the gas generator of the present invention adopts the structure so that the enhancer device may be provided in the combustion chamber and the flames from the ignitor device may be propagated in the circumferential direction and the radial direction of the combustion chamber by the enhancer device.

Thereby, the combustion in the combustion chamber broadens all over the whole of gas generants instantaneously by the flames spouted from the ignitor directly and the flames propagated by the enhancer device. Therefore, the gas discharged into the airbag can be uniformed.

In the gas generator of the present invention, the ignitor device is eccentrically disposed with respect to an axis of the housing.

According to the above gas generator, for example, even when the ignitor device is eccentrically disposed with respect to an axis of the housing, there is no partial combustion which occurs in the vicinity of the ignitor eccentrically disposed in the housing. And the combustion broadens all over the whole of gas generants instantaneously.

In the gas generator of the present invention, the enhancer device comprises enhancer agent containing auto-ignition explosive composition. According to the above gas generator, the enhancer device is automatically ignited by the flames and heat spouted from the ignitor device, the flames arc propagated circumferentially and radially of the housing.

BEST MODE FOR CARRYING OUT THE INVENTION

Description will be given on the gas generator of the present invention.

The gas generator of the present invention is designed for expanding and inflating a driver's seat airbag. In the gas generator of the present invention, flames of the Ignitor device are propagated in the circumferential direction and radial direction of the housing through enhancer devices so that combustion of the gas generants may broaden in the whole instantaneously, whereby the generated gas is uniformly discharged into the airbag.

In the following, certain embodiments of the gas generator of the present invention will be described, which are classified into two types. In one type, the gas generants are ignited by a plurality of ignitor devices (Cf. FIGS. 1–17). In other type, the gas generants are ignited by a single ignitor device (Cf. FIGS. 18–23).

Figure 1:
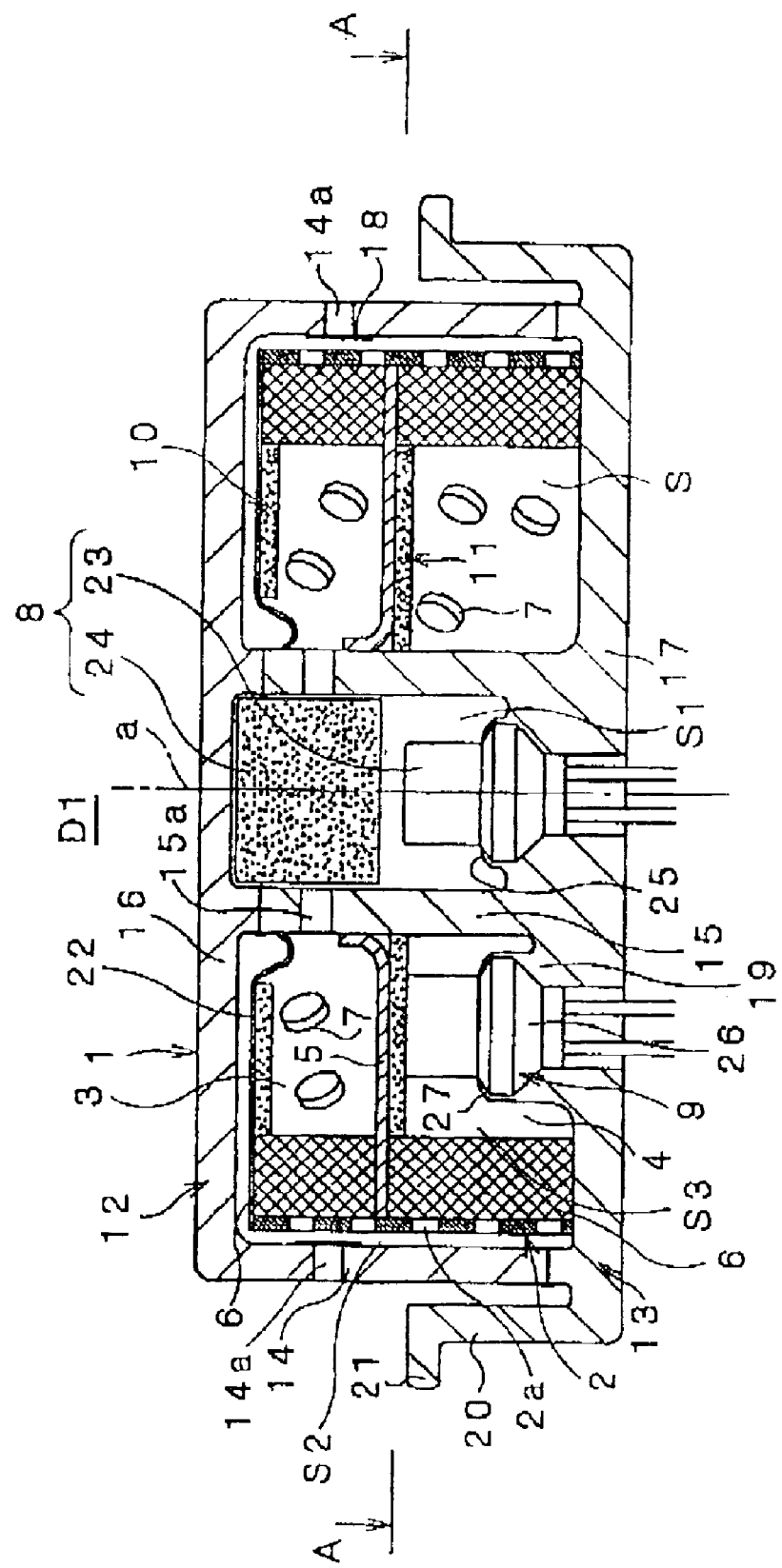
FIG. 1 is a sectional view of a gas generator of the first embodiment according to the present invention.
Figure 2:
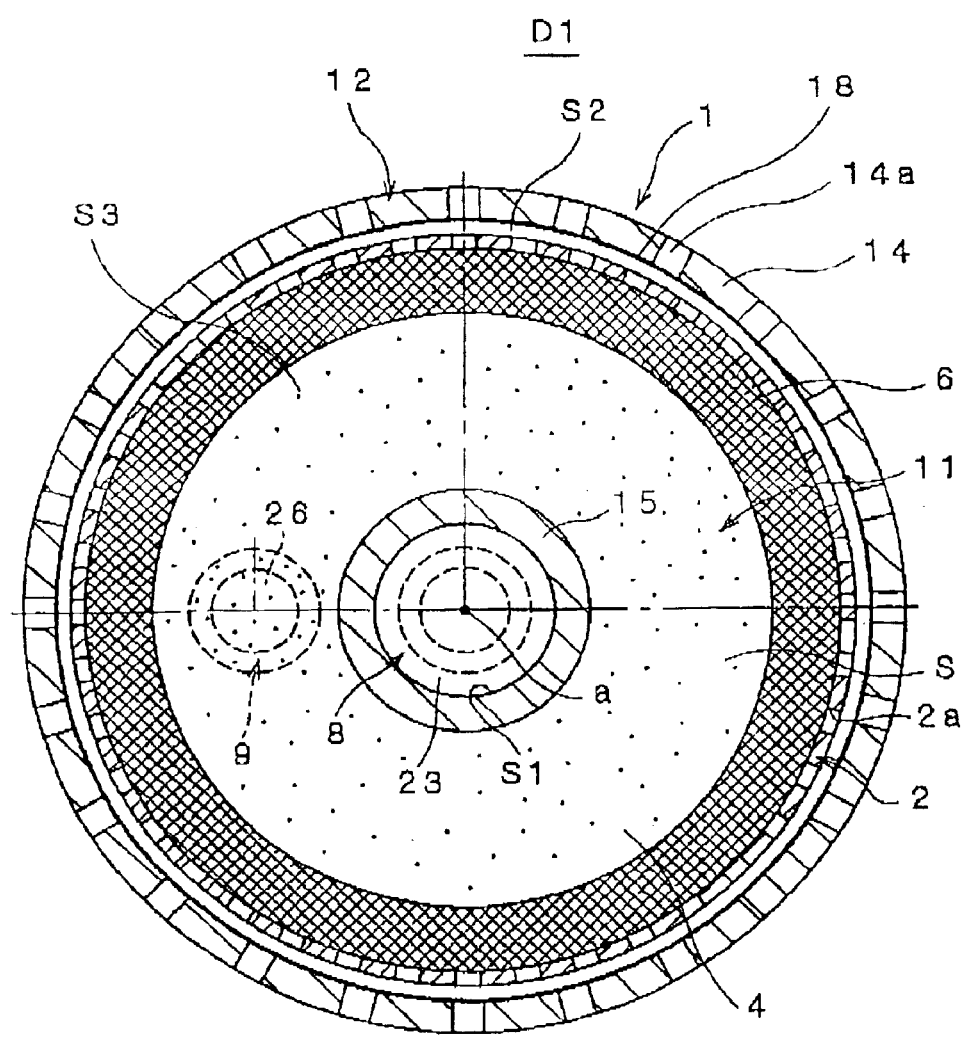
FIG. 2 is a diagram taken along arrowed line A—A of FIG. 1.

The gas generator D1 shown in FIGS. 1 and 2 is designed so as to control an expansion and inflation of the airbag. The gas generator D1 comprises a short cylindrical housing 1, a filter supporting member 2 mounted in the housing 1, a ring partition member 5 for partitioning an inner space of the housing 1 into two combustion chambers 3, 4, filters 6 mounted in the combustion chambers 3, 4, gas generants 7 packed in the each combustion chamber 3, 4, ignitor devices 8, 9 for spouting flame into the combustion chambers 3, 4 respectively and independently, enhancer devices 10, 11 for enhancing the flames of the ignitor devices 8, 9 respectively and independently.

The housing 1 has a double cylinder structure formed by an upper casing 12 and a lower casing 13. The housing 1 is structured so that the upper casing 12 and the lower casing 13 may be joined to each other by butt welding (e.g. friction welding), whereby upper ends and lower ends of an outer cylinder 14 and an inner cylinder 15 can be closed by two cover plates 16, 17. The interior of the housing 1 is partitioned into a closed space S (annular space) formed between the outer cylinder 14 and the inner cylinder 15 and a storage space S1 formed in the inside of the inner cylinder 15.

The outer cylinder 14 of the housing 1 has a plurality of gas discharge holes 14a so as to communicate between the closed space S and the interior of the airbag. The gas discharge holes 14a open in the outer cylinder 14 on the upper cover plate 16 side and are arranged along a circumferential direction of the housing 1 apart from each other by a predetermined space. The gas discharge holes 14a are closed by (a) burst plate(s) 18 stuck on an internal circumferential surface of the outer cylinder 14. The burst plate 18 is, for example, formed from a metal foil such as aluminum and serves as moisture-proof and inner pressure adjustment of the housing 1. The inner cylinder 15 has a plurality of flame leading holes 15a communicating between the spaces S and S1. The flame leading holes 15a open in the inner cylinder 15 on the upper cover plate 16 side and are arranged along the circumferential direction of the housing 1 apart from each other by a predetermined space.

A short inner cylinder 19 is integrally formed on the lower cover plate 17 of the housing 1 so as to project into the closed space S. The short inner cylinder 19 is disposed between the outer cylinder 14 and the inner cylinder 15, also, which is eccentrically disposed in a radial and outward direction with respect to the axis "a" of the housing 1. The lower cover plate 17 has a flanged cylinder 20 extending from an external circumferential edge of the lower cover plate 17 toward the upper cover plate 16 along a side surface of the outer cylinder 14 on the outer diameter side. A retainer or equivalent of the airbag module comprising the airbag and a bag cover is attached to a flange 21 of the flanged cylinder 20.

The cylindrical filter supporting member 2 is disposed in the closed space S of the housing 1. The filter supporting member 2 is produced, for example, by forming a metal such as a perforated metal plate (punching metal plate) or an expanded metal plate into a cylindrical form. The filter supporting member 2 is disposed in a space between the outer cylinder 14 and the short inner cylinder 19 and extends from the lower cover plate 17 to a vicinity of the upper cover plate 16. An upper end of the filter supporting member 2 is closed by a ring cover plate 22 fitted around on external circumferential surface of the inner cylinder 15. The filter supporting member 2, the lower cover plate 17 and the ring cover plate 22 serve to partition the closed space S into a gas passage space S2 (annular space) on the outer cylinder 14 side and a combustion space S3 (annular space) on the inner cylinder 15 side. Also, the filter supporting member 2 has a plurality of gas passage holes 2a so as to communicate between the gas passage space S2 and the combustion space S3.

The partition member 5 is fitted between an internal circumferential surface of the filter supporting member 2 and an external circumferential surface of the inner cylinder 15 in substantial parallel with the cover plates 16, 17, whereby the combustion chamber S3 is partitioned into the two, i.e. upper and lower combustion chambers 3, 4 in a specified volume proportion. A position of the partition member 5 is set by confronting an upper end of the short inner cylinder 19.

The filters 6 are disposed in the combustion chambers 3, 4, respectively. The filters 6 can be produced at a low price, for example, by forming an aggregation of a stockinet wire netting or crimped metal wire materials into a cylindrical shape. The filters 6 are disposed in the space between the filter supporting member 2 and the short inner cylinder 19. One of the filters 6 extends from the ring partition plate 5 to the ring cover plate 22 in the combustion chamber 3, and the other of the filters 6 extends from the lower cover plate 17 to the ring partition plate 5 in the combustion chamber 4.

The gas generants 7 are packed in the combustion chambers 3, 4 on an internal circumferential side of the filters, which generate high temperature gas by combustion. The packed amount of the gas generants 7 is adjusted in advance so that the expansion and inflation of the airbag can be controlled.

The ignitor devices 8, 9 are respectively disposed in the inner cylinder 15 and the short inner cylinder 19. The ignitor device 8 comprises an ignitor 23 and enhancer agents 24. The ignitor 23 is such an electric type ignitor as ignites when an electric current flows in accordance with a collision signals from a collision detecting sensor. The ignitor 23 is mounted on the lower cover plate 17 so as to project into the storage space S1 of the inner cylinder 15. The ignitor 23 is fixed thereto by crimping lugs 25 projecting from the lower cover plate 17 into the storage space S1 of the inner cylinder 15. The enhancer agents 24 are loaded in the inner cylinder 15 on the upper cover plate 16 side and apart from the ignitor 23 with a gap. This arrangement of the ignitor device 8 allows the enhancer agents 24 to be ignited by the ignition of the ignitor 23 and in turn allows the flames of the enhancer agents 24 to be spouted into the combustion chamber 3 through the flame leading holes 15a so as to ignite and burn the gas generants 7 packed in the combustion chamber 3.

The ignitor device 9 is constituted by the ignitor 26 only. The ignitor 26 is such an electric type ignitor as ignites when an electric current flows in accordance with a collision signals from a collision detecting sensor. The ignitor 26 is disposed in the short inner cylinder 19 so as to project into the combustion chamber 4. And the ignitor 26 is fixed thereto by crimping lugs 27 projecting from the short inner cylinder 19 Into the combustion chamber 4. The ignitor 26 is eccentrically arranged in radial and outward direction with respect to the axis "a" of the housing 1. And the ignitor 26 spouts the flames toward the partition plate 5 and a surrounding space around the axis "a" of the housing 1 so as to ignite and burn the gas generants 7 packed in the combustion chamber 4.

The enhancer devices 10, 11 comprise the enhancer agents formed into ring-shaped plates. It is preferable that explosive compositions based on nitrogen-containing organic compounds as fuel with the auto-ignition function are employed as the enhancer agents. An explosive composition, which comprises a following mixture and binders added to the mixture, is optimum as the explosive composition based on nitrogen-containing organic compounds as fuel with the auto-ignition function. The above mixture comprises organic tetrazole compounds, oxidizing agents using nitrate as the main component, combustion modifier including a simple metal substance such as Zr, Hf, Mo, W, Mn, Ni and Fe, or oxides thereof or sulfides thereof. Since those enhancer agents can be ignited by the ignitor devices 8, 9, the flames can be instantaneously propagated in the circumferential direction and the radial direction of the housing. In addition to this, since the enhancer agents ignite automatically under high temperature, for example, not less than 200° C., when the gas generator is exposed to flames in a vehicle fire and the like, the enhancer agents ignite before strength of the gas generator deteriorates under high temperature. Consequently, the ignition and burning of the gas generants 7 cause so as to prevent the housing of the gas generator from being destroyed or damaged. The enhancer devices 10, 11 are loaded in the combustion chambers 3, 4, respectively.

The enhancer device 10 is fitted along the internal circumferential surface of the filter 6 and placed between the ring cover plate 22 and the gas generants 7 in substantial parallel with the ring cover plate 22. The enhancer device 10 covers all over the circumferential direction as well as the radial direction of the housing 1 in direct contact with the gas generants 7 packed in the combustion chamber 3. The flames spouted out from the flame leading holes 15a by the ignitor device 8 are propagated around the axis "a" of the housing 1 and from the inner cylinder 15 toward the outer cylinder 14. The enhancer device 11 is disposed between the internal circumferential surface of the filter 6 and the external circumferential surface of the inner cylinder 15 and arranged between the ring partition plate 5 and the ignitor 26 in substantial parallel with the ring partition plate 5. The enhancer device 11 covers all over the circumferential direction as well as the radial direction of the housing 1 in contact with an upper end of the ignitor 26 disposed eccentrically and also in direct contact with the gas generants 7 packed in the combustion chamber 4. As a result of this, the flames spouted out from the ignitor 26 are propagated around the axis "a" of the housing 1 and toward the outer cylinder 14.

Now, operation of the gas generator D1 will be described.

When a vehicle collision is detected by the collision sensor, an electric current flows through the ignitor 23 and the ignitor 23 ignites then the enhancer agents 24 fire. The flames of the enhancer agents 24 are spouted from the flame leading holes 15a into the combustion chamber 3 so as to ignite and burn the gas generants 7 and the enhancer agents of the enhancer device 10 simultaneously. As a result of this, the flames of the ignitor 23 are transferred to the enhancer agents of the enhancer device 10 and are propagated in the circumferential direction and the radial direction of the housing 1. This causes a burning of the gas generants 7 in the combustion chamber 3 and a generation of high temperature gas therein. The combustion in the combustion chamber 3 broadens instantaneously all over the whole gas generants 7 by the flames spouted into the combustion chamber 3 and the flames propagated by the enhancer device 10.

The high temperature gas generated in the combustion chamber 3 flows into the filter 6 for slag collection and cooling. Then the gas flows into the gas passage space S2 through the gas passage holes 2a for uniformity. Further, the combustion in the combustion chamber 3 proceeds. And, when the pressure in the housing 1 reaches a predetermined pressure, the burst plate 18 is broken. And clean gas, which is uniformed in the gas passage space S2, is discharged from the gas discharge holes 14a into the airbag.

As a result of this, the airbag starts expanding and inflating moderately by a small amount of gas generated in the only combustion chamber 3.

Sequentially, an electric current flows through the ignitor 26 with minute time delay after the combustion starts in the combustion chamber 3. The flames of the ignitor 26 are spouted around the short inner cylinder 19 so as to ignite and burn the gas generants 7 in the combustion chamber 4 and simultaneously spouted toward the enhancer device 11 so as to ignite the enhancer agents of the enhancer device 11. As a result of this, the flames of the ignitor 26 are transferred to the enhancer agents of the enhancer device 11 and propagated in the circumferential direction and the radial direction of the housing 1. Consequently, the gas generants 7 in the combustion chamber 4 burn and high temperature gas generates therein.

The combustion in the combustion chamber 4 are instantaneously spread in the circumferential direction and the radial direction of the housing 1 by the flames spouted from the ignitor 26 directly into the combustion chamber 4 and the flames propagated by the enhancer device 11. Then, the combustion in the combustion chamber 4 broadens all over the whole of gas generants 7 instantaneously.

As a result of this, there is no partial combustion which occurs in the vicinity of the ignitor 26 eccentrically disposed in the combustion chamber 4. The gas can be uniformly generated inside the housing 1.

The high temperature gas generated in the combustion chamber 4 flows into the filter 6 for slag collection and cooling thereat. Then, the gas flows into the gas passage space S2 for uniformity and is discharged from the gas discharging holes 14a into the airbag uniformly. Consequently, the airbag is expanded and inflated rapidly by a large amount of clean gas discharged from the both combustion chambers 3, 4.

As a result of this, in the initial stage of inflation, the airbag starts expanding and inflating moderately by a small amount of gas generated in the only one combustion chamber 3, after minute time passes, the airbag is expanded and inflated rapidly by a large amount of gas generated in the both combustion chambers 3, 4.

In addition, the whole airbag is smoothly expanded and inflated by the gas uniformly discharged from the gas discharging holes 14a without any partial expansion and inflation.

When the ignitors 23, 26 of the ignitor devices 8, 9 ignite by the electric current, minute time delay between the ignitions of the ignitors 23, 26 is not always necessary. It is chosen appropriately so as to meet the collision patterns of the vehicle.

For example, in the case of a high critical collision such as a frontal clash or a head-on clash with high speed, the ignitors 23, 26 are concurrently ignited by the electric current so that the airbag can be expanded and inflated rapidly by a large amount of gases generated in the both combustion chambers 3, 4. In the case of a medium critical collision, the ignitors 23, 26 are ignited by the electric current with minute time delay between the ignitions of the ignitors 23, 26 so that the airbag can be moderately expanded and inflated by a small amount of gas in the initial stage, after the minute time passes, the airbag can be rapidly expanded and inflated by a large amount of gases. Further, in the case of a light critical collision, for example, only one ignitor 23 ignites by an electric current so that the airbag can be moderately expanded and inflated by a small amount of gas with taking a comparatively long time.

Thus, according to the gas generator D1, the amount of gas discharged into the airbag can be adjusted by selecting the ignitions of the ignitor devices 8, 9 In response to the collision patterns of vehicle, whereby, the expansion and inflation of the airbag can be controlled.

By the enhancer devices 10, 11 for propagating the flames of the ignitor devices 8, 9 in the circumferential direction and the radial direction of the housing 1, the combustion of the gas generants 7 in the combustion chambers 3, 4 can broaden to the whole instantaneously. Accordingly, the amount of gas discharged from the gas discharging holes 14a into the airbag can be uniformed.

Consequently, even when the ignitor device 9 is eccentrically disposed in the radial and outward direction with respect to the axis "a" of the housing 1, the whole airbag can be smoothly expanded and inflated without any partial expansion and inflation. Next, reference will be made to the gas generator D2 shown in FIGS. 3 and 4.

Figure 3:
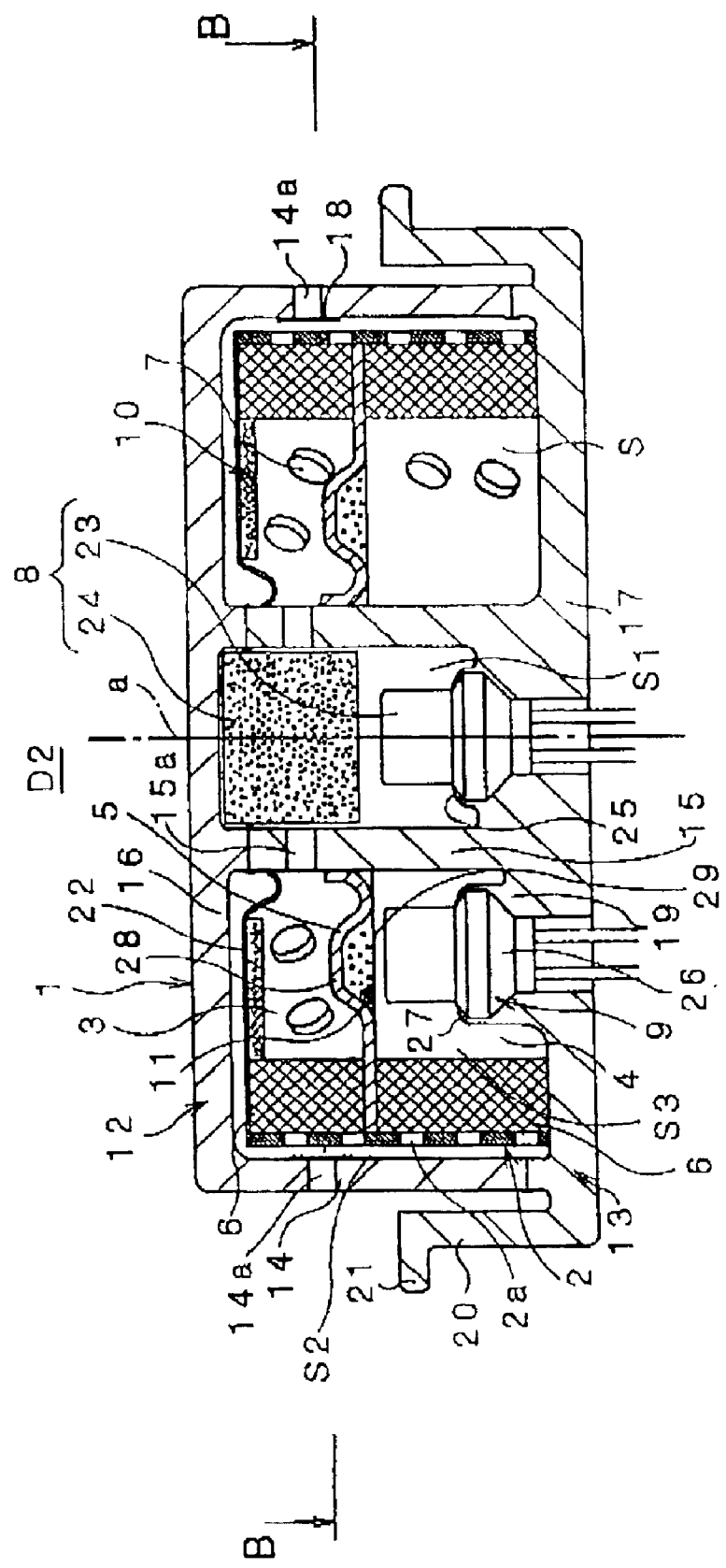
FIG. 3 is a sectional view of a gas generator of the second embodiment according to the present invention.
Figure 4:
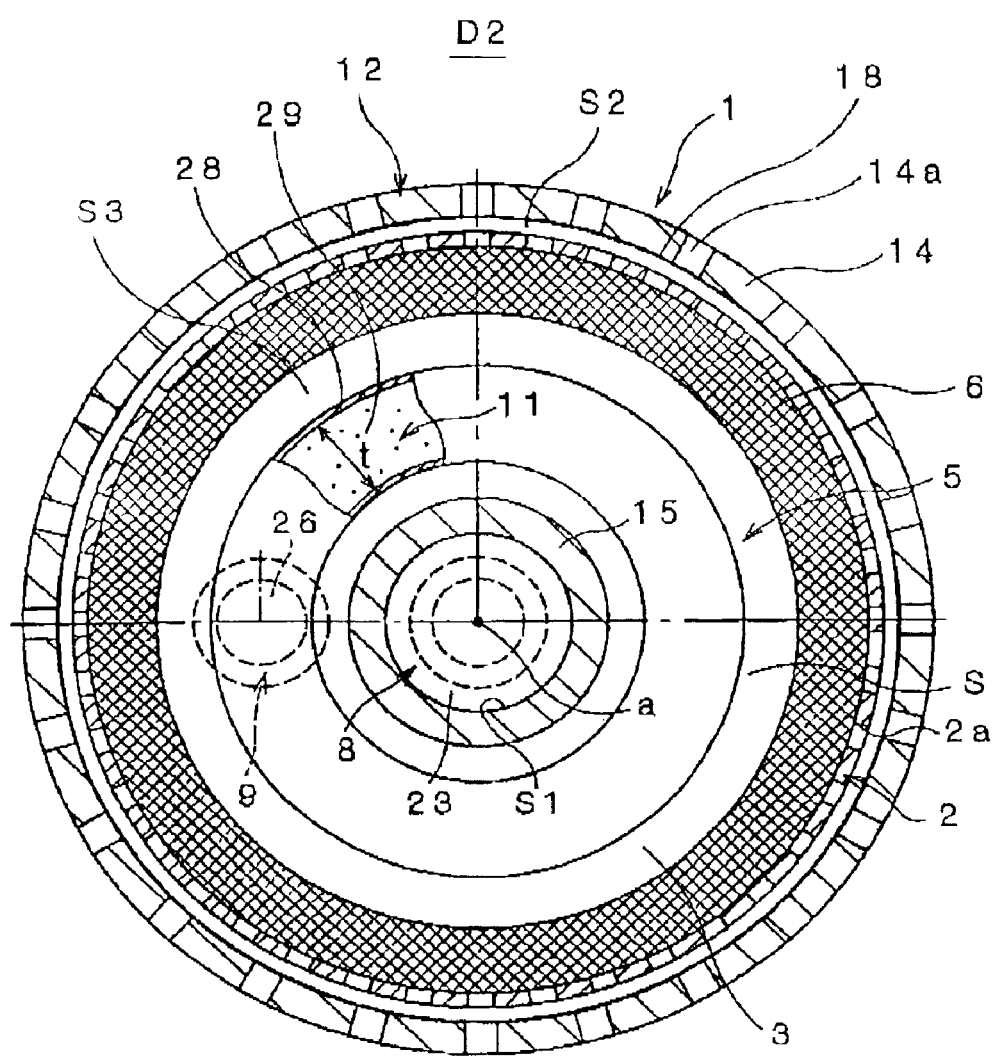
FIG. 4 is a diagram taken along arrowed line B—B of FIG. 3.

The gas generator D2 shown in FIGS. 3 and 4 has a different structure from the gas generator D1. In the gas generator D2, the enhancer device 11 and the ring partition plate 5 are integrally formed. In FIGS. 3 and 4, the same reference characters as those of FIGS. 1 and 2 show the same elements as those of FIGS. 1 and 2. Therefore, explanations about them are omitted.

In the gas generator D2 of FIGS. 3 and 4, the enhancer agents of the enhancer device 11 are loaded in the interior of the ring partition member 5 so as to be integrally combined therewith. An annular enhancing groove 28 is formed in the ring partition member 5, in which the enhancer agents are charged.

The enhancing groove 28 is formed so as to confront the top end of the ignitor 26 of the ignitor device 9 and extend along the external circumferential surface of the inner cylinder 15 surrounding the axis "a" of the housing 1. The enhancing groove 28 is formed so as to open toward the combustion chamber 4 with a predetermined width "t" and projects into the combustion chamber 3 with a predetermined depth. The enhancer agents of the enhancer device 11 are stored in the interior of the enhancing groove 28 of the ring partition member 5, whereby, the enhancing groove 28 spreads in the circumferential direction and radial direction of the housing 1. The enhancing groove 28 storing the enhancer device 11 is tightly sealed by a metal plate 29 stuck on the ring partition plate 5. The metal plate 29 is formed from a metal foil such as an aluminum foil, and formed into a ring-shaped form. The metal plate 29 closes the enhancing groove 28 at the inside of the combustion chamber 4. The metal plate 29 is burst by the flames spouted out from the ignitor 26 so that the enhancer agents of the enhancer device 11 can be ignited by the flames. The enhancer agents of the enhancer device 11 are indirectly contacted with the gas generants 7 through the metal plate 29.

Now, operation of the gas generator D2 will be described.

When the ignitor 23 is ignited by an electric current in accordance with a detection of a vehicle collision, the combustion in the combustion chamber 3 broadens to the whole of the gas generants instantaneously by the flames spouted into the combustion chamber 3 and the flames propagated by the enhancer device 10 as well as the case of FIGS. 1,2. The high temperature gas generated in the combustion chamber 3 undergoes a slag collection and cooling process during passing through the filter 6. Then, the gas is made uniform in the gas passage space S2. And thereafter the uniform gas is discharged into the airbag. Consequently, the airbag starts expanding and inflating moderately by a small amount of clean gas generated in the only one combustion chamber 3.

Sequentially, the ignitor 26 is ignited by an electric current after minute time passes from the start of combustion in the combustion chamber 3. Then, the flames of the ignitor 26 are spouted around the short inner cylinder 19 so as to burn the gas generants 7 in the combustion chamber 4 and are simultaneously spouted toward the ring partition plate S so as to burst the metal plate 29. And, the enhancer agents of the enhancer device 11 are ignited. As a result of this, the flames of the ignitor 26 are transferred to the enhancer agents of the enhancer device 11 and are propagated in the circumferential direction and the radial direction of the housing 1. Then, the gas generants 7 in the combustion chamber 4 burn and high temperature gas generates therein. At this time, the flames transferred to the enhancer agents of the enhancer device 11 runs around the external circumferential surface of the inner cylinder 15 because of the configuration of the enhancing groove 28 so as to propagate the flames from the top end of the ignitor 26 to the opposite space side between the inner cylinder 15 and the filter 6. The thickness of the metal plate 29 is set so that the metal plate 29 may be burst by the burning of the enhancer agents.

Accordingly, the combustion in the combustion chamber 4 are instantaneously spread in the circumferential direction and the radial direction of the housing 1 by the flames spouted from the ignitor 26 directly into the combustion chamber 4 and the flames propagated through the enhancer device 11 and the enhancing groove 28 of the ring partition plate 5. Then, the combustion broadens all over the whole of gas generants 7.

As a result, in the combustion chamber 4, there is no partial combustion in the vicinity of the ignitor 26 eccentrically disposed. The gas can be uniformly generated over the whole of the housing 1. The high temperature gas generated in the combustion chamber 4 flows into the filter 6. Thereat, the high temperature gas undergoes the slag collection and cooling process. After the high temperature gas becomes uniform in the gas passage space S2, it is discharged into the airbag. Thus, the airbag is rapidly expanded and inflated by a large amount of clean gas discharged from the both combustion chambers 3, 4.

In case of the gas generator D2 as well as the case of the gas generator D1, the expansion and inflation of the airbag can be controlled by choosing a minute time delay between the ignitions of the ignitors 23, 26 appropriately in response to the collision patterns of vehicle.

Thus, according to the gas generator D2 as well as the gas generator D1, the expansion and inflation of the airbag can be controlled and also the whole airbag can be smoothly expanded and inflated without any partial expansion and inflation.

Next, reference will be made to the gas generator D3 shown in FIGS. 5 to 7.

Figure 5:
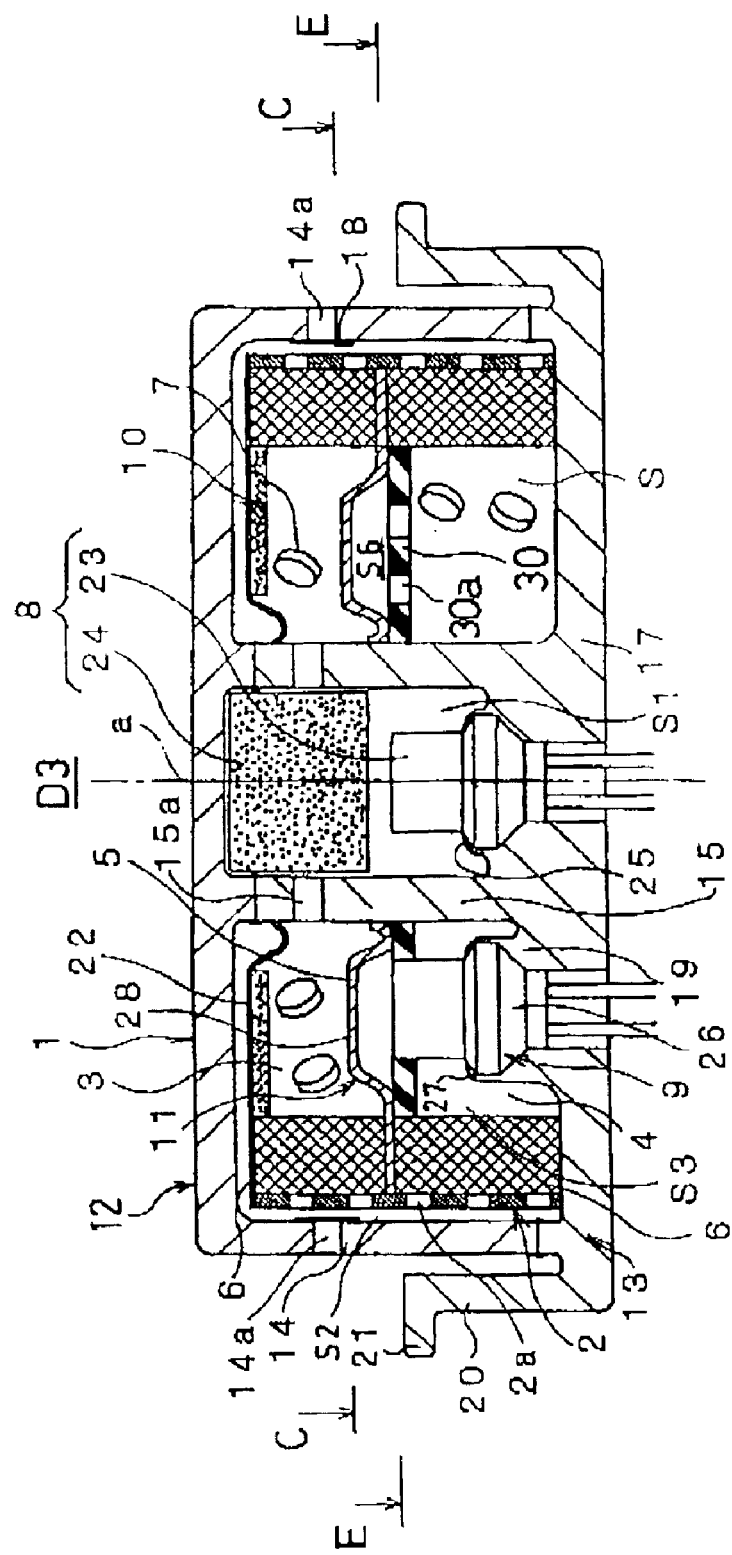
FIG. 5 is a sectional view of a gas generator of the third embodiment according to the present invention.
Figure 6:
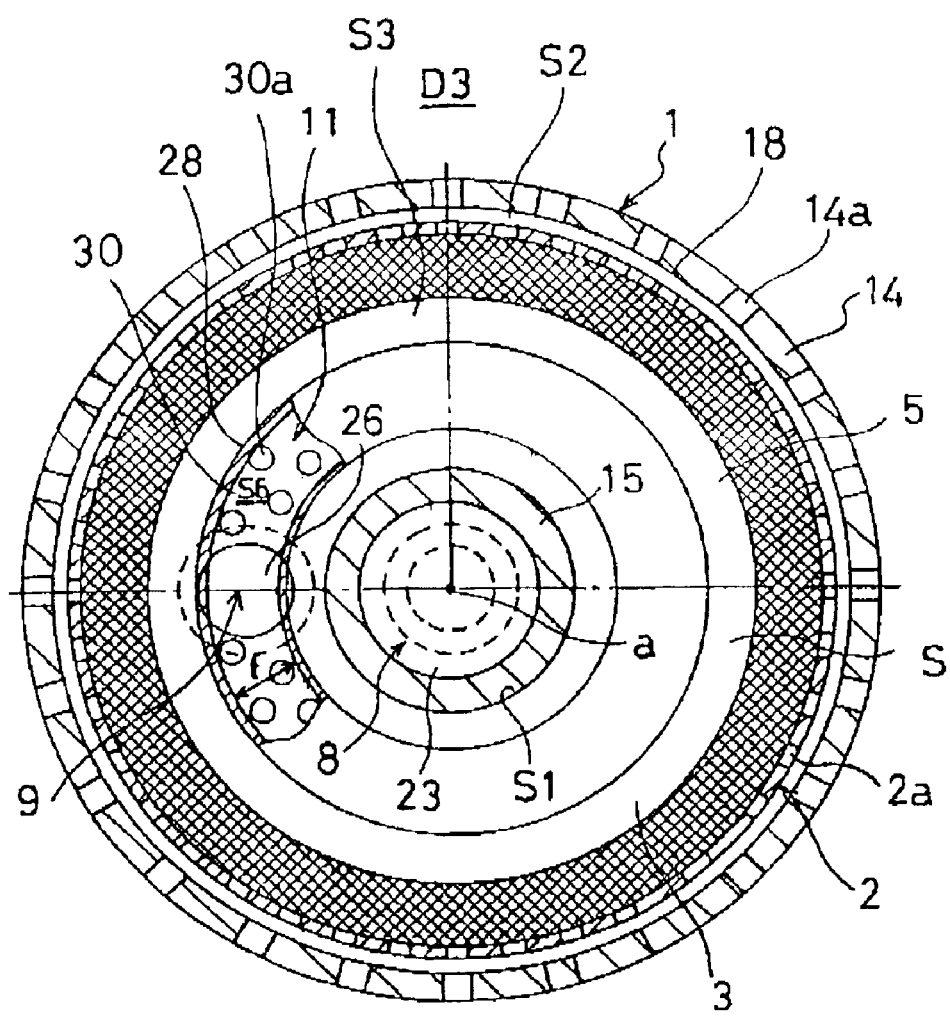
FIG. 6 is a diagram taken along arrowed line C—C of FIG. 5.
Figure 7:
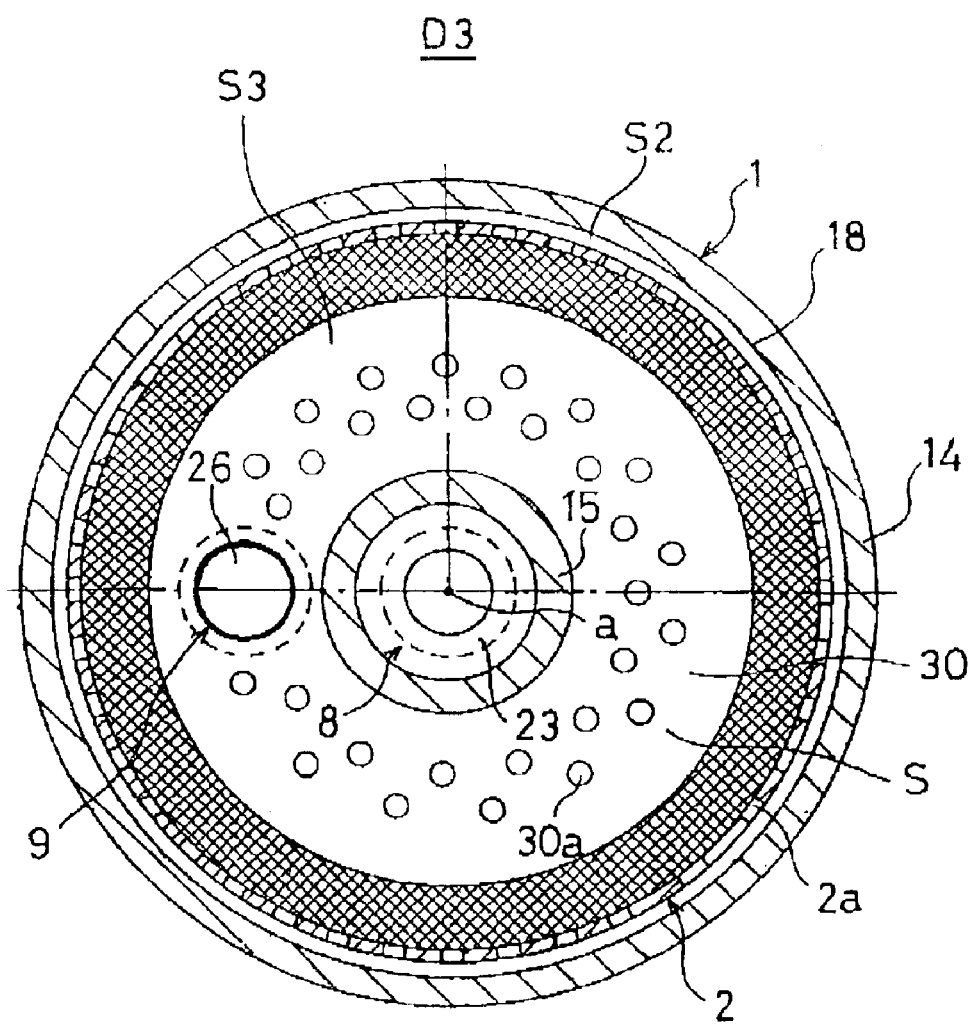
FIG. 7 is a diagram taken along arrowed line E—E of FIG. 5.

In the gas generator D3 of FIGS. 5 to 7, the enhancer device 11 has an enhancing groove 28 and a cushioning member 30. In FIGS. 5 to 7, the same reference characters as those of FIGS. 3 and 4 show the same elements as those of FIGS. 3 and 4. Therefore, explanations about them are omitted.

In the gas generator D3 of FIGS. 5 to 7, an enhancing space S6 of the enhancer device 11 may be formed by the cushioning member 30 and the enhancing groove 28 without enhancer agent. The cushioning member 30 is fitted between the ring partition member 5 in the combustion chamber 4 and the gas generants 7. The cushioning member 30 abuts on the ring partition member 5 so as to shut the interior of the enhancing groove 28 from the combustion chamber 4. The cushioning member 30 constructs the annular enhancing space S6 with the interior of the enhancing groove 28. The annular enhancing space S6 extends along an external circumferential surface of the inner cylinder 15 surrounding the axis "a" of the housing 1 in accordance with the configuration of the enhancing groove 28. A top end portion of the ignitor 26 is fitted in the cushioning member 30 then exposes to the enhancing space S6. The cushioning member 30 has a plurality of enhancing holes 30a so that the enhancing space S6 may open into the combustion chamber 4. The enhancing holes 30a are arranged along the annular enhancing space S6 and communicate between the enhancing space S6 and the combustion chamber 4. A diameter of each enhancing hole 30a is set so that the gas generants 7 may not enter the enhancing space S6 therethrough.

The cushioning member 30 has functions of preventing the gas generants 7 from being powdered by vibration and preventing the gas generants 7 from entering the interior of the enhancing space S6. Also, the cushioning member 30 serves as heat insulating material so as to suppress heat transfer between the combustion chambers 3, 4. Accordingly, materials such as ceramic sheets having the heat insulating property (e.g. ceramic fiber sheets and the like) or elastic materials (e.g. silicone foam materials and the like) are preferably used as the cushioning member 30.

Now, operation of the gas generator D3 will be described.

When vehicle collision is detected by the collision sensor and then the ignitor 23 is ignited by an electric current, the combustion in the combustion chamber 3 broadens all over the whole of the gas generants 7 instantaneously by the flames spouted into the combustion chamber 3 and the flames propagated by the enhancer device 10 in the same manner as in FIGS. 1 and 2. The high temperature gas generated in the combustion chamber 3 undergoes slag collection and cooling process in the filter 6. Then, the gas is uniformed in the gas passage space S2. Thereafter the gas is discharged into the airbag. As a result of this, the airbag starts expanding and inflating moderately by a small amount of clean gas generated in the only one combustion chamber 3.

Sequentially, the ignitor 26 is ignited by the electric current with minute time delay after the start of combustion in the combustion chamber 3. The flames are spouted from the ignitor 26 into the annular enhancing space S6, then, propagated along the enhancing space S6 in the circumferential direction and the radial direction of the housing 1, and then, sequentially spouted into the combustion chamber 4 from the enhancing holes 30a of the cushioning member 30. The flames cause the combustion of the gas generants 7 in the combustion chamber 4 and a high temperature gas is generated therein. At this time, the flames spouted into the enhancing space S6 run around the external circumferential face of the inner cylinder 15 so as to be propagated from the top end of the ignitor 26 to the opposite space side between the inner cylinder 15 and the filter 6 because of the configuration of the enhancing space S6.

Thus, the combustion in the combustion chamber 4 is propagated through the enhancing space S6 from the ignitor 26 and instantaneously spreads in the circumferential direction and the radial direction of the housing 1 by the flames spouted out from the enhancing holes 30a of the cushioning member 30. Consequently, the combustion in the combustion chamber 4 broadens all over the whole of gas generants 7.

Therefore, in the combustion chamber 4, there is no partial combustion In vicinity of the ignitor device 26 disposed on the eccentric position. The gas can be uniformly generated all over the whole area in the housing 1.

The high temperature gas generated in the combustion chamber 4 flows into the filter 6 for slag collecting and cooling. After unifying in the gas passage space S2, the gas is discharged into an airbag. And, the airbag is rapidly expanded and inflated by a large amount of clean gas discharged from the both combustion chambers 3, 4.

In case of the gas generator D3 as well as the case of the gas generator D1, the expansion and inflation of the airbag can be controlled by choosing a minute time delay between the ignitions of the ignitors 23, 26 appropriately in response to the collision patterns of vehicle.

Thus, according to the gas generator D3 as well as the gas generator D1, the expansion and inflation of the airbag can be controlled and also the whole airbag can be smoothly expanded and inflated without any partial expansion and inflation.

In addition, since the gas generator D3 is structured so that the enhancing groove 28 projecting into the combustion chamber 3 may be formed in the ring partition plate 5 and also the top end portion of the ignitor 26 may be fitted into the enhancing space S6 of the enhancing groove 28, the housing 1 can be reduced in axial length and a small-size gas generator D3 can be provide.

Figure 8:
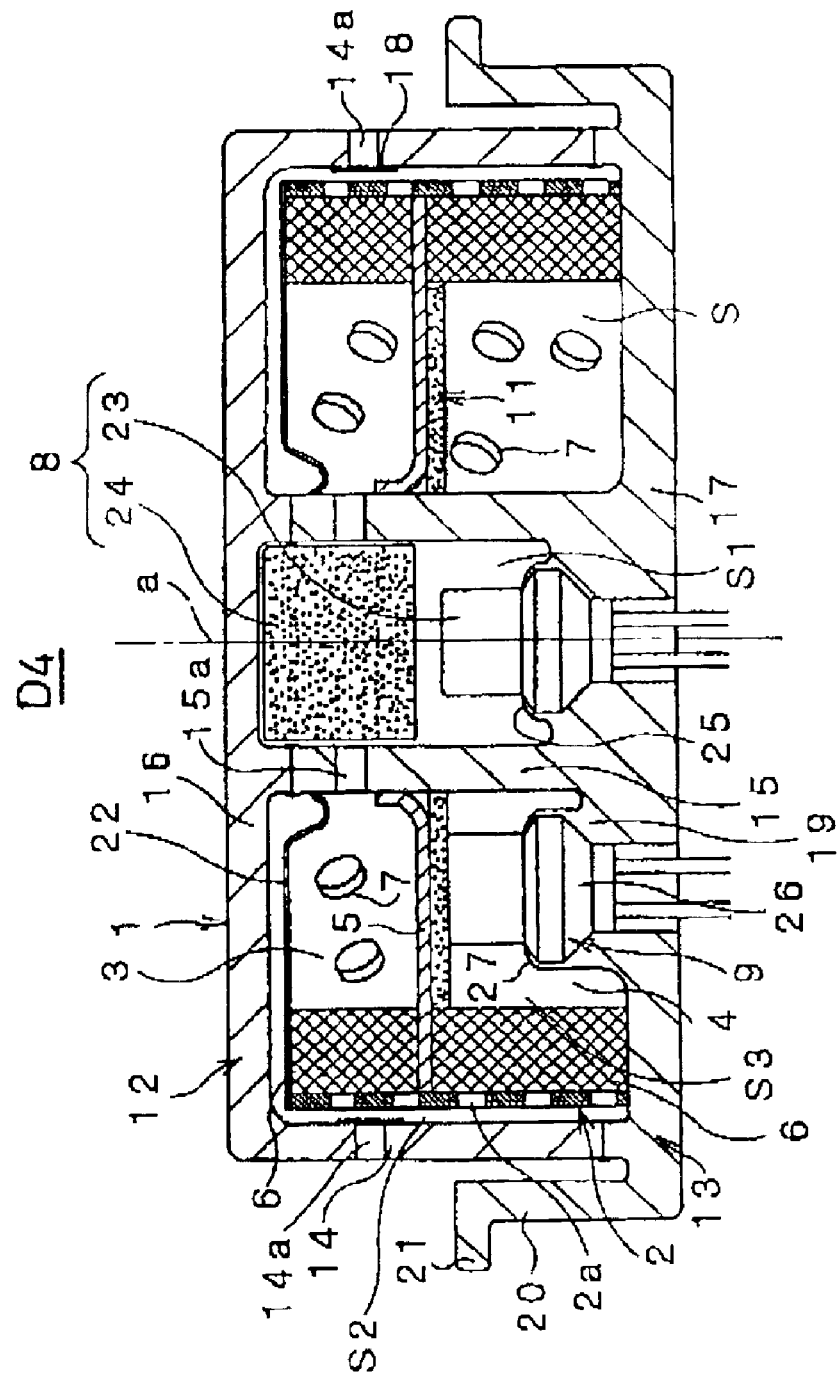
FIG. 8 is a sectional view of a gas generator of the fourth embodiment according to the present invention.

According to the gas generators D1–D3, the enhancer devices 10, 11 are mounted in the combustion chambers 3, 4 respectively. However, another structure can be applied as shown in FIG. 8. In FIG. 8, the enhancer device 11 is mounted in only the combustion chamber 4 in which the ignitor 9 is disposed on the eccentric position.

According to the gas generator D4 of FIG. 8, the expansion and inflation of the airbag can be controlled in response to the collision patterns of vehicle as well as the gas generator D1. In combustion chamber 4, the flames from the ignitor 26 can be propagated in the circumferential direction and the radial directions of the housing 1 by the enhancer device 11 as well as the gas generator D1–D3. Thereby, the combustion broadens all over the whole of gas generants instantaneously. Therefore, the whole airbag can be smoothly expanded and inflated without any partial expansion and inflation.

Next, reference will be made to the gas generator D5 shown in FIGS. 9 and 10.

Figure 9:
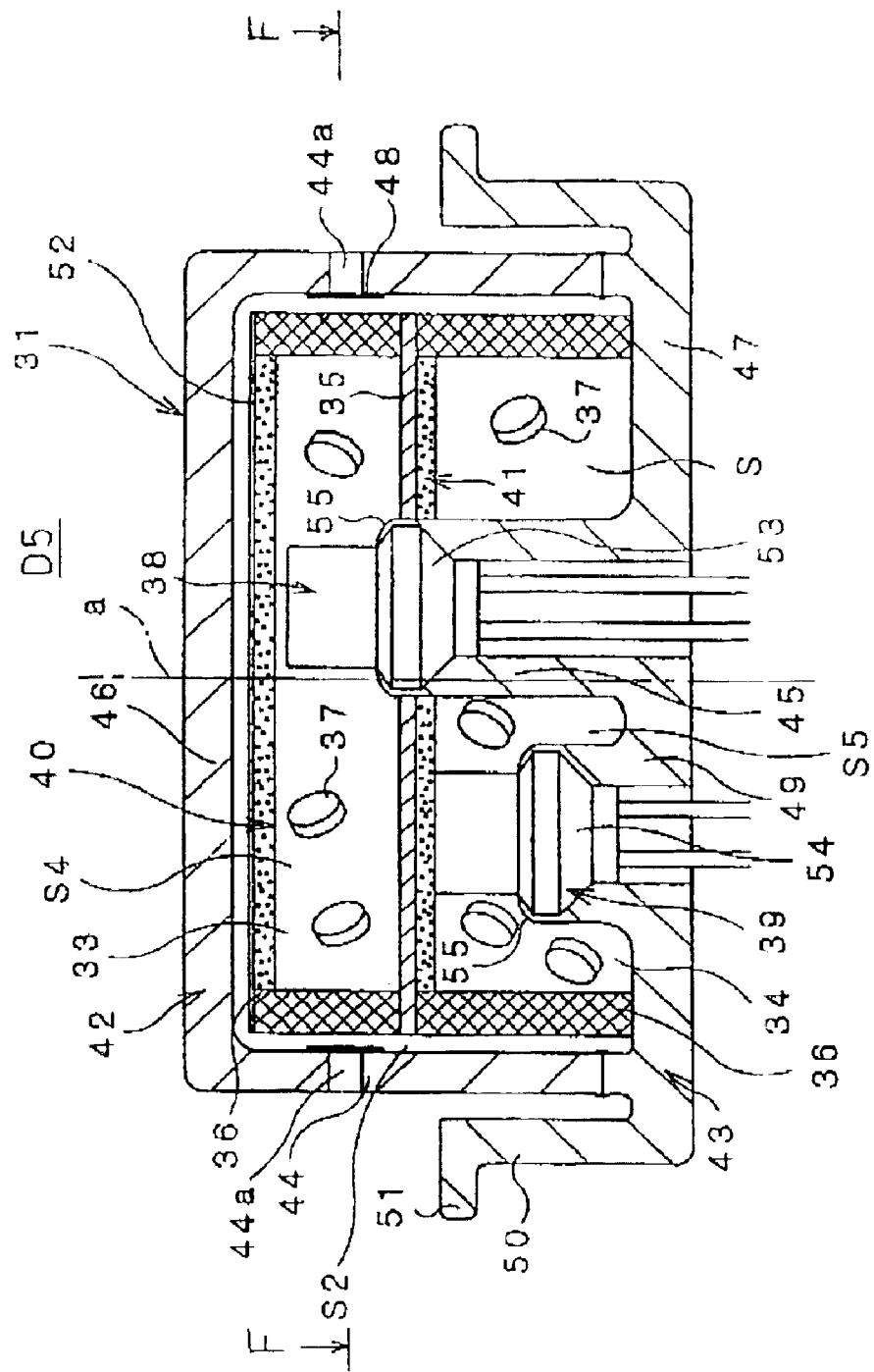
FIG. 9 is a sectional view of a gas generator of the fifth embodiment according to the present invention.
Figure 10:
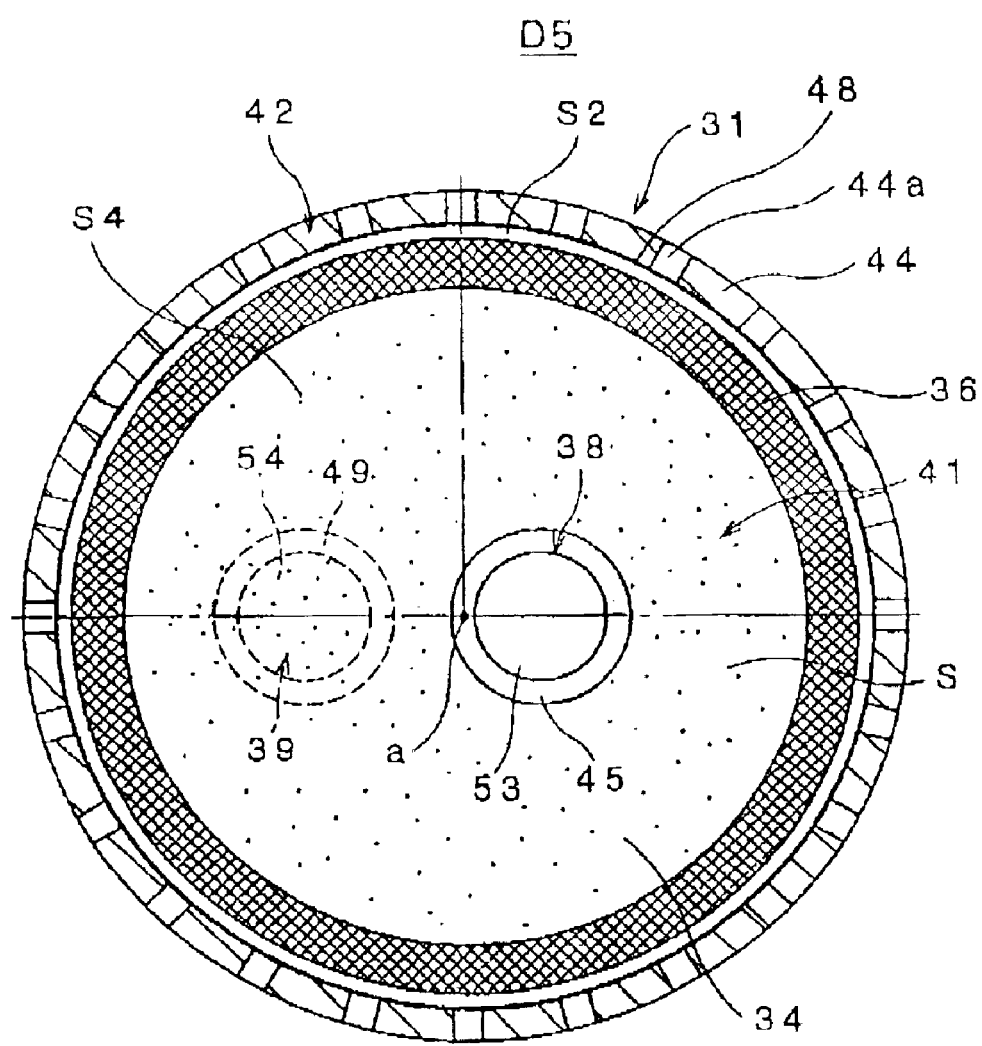
FIG. 10 is a diagram taken along arrowed line F—F of FIG. 9.

The gas generator D5 shown in FIGS. 9 and 10 is different from the gas generator D1 in the following point. A housing 31 has a single cylinder structure and each ignitor device 38, 39 is disposed on an eccentric position with respect to an axis "a" of the housing 31.

The gas generator D5 shown in FIGS. 9 and 10 comprises the short cylindrical housing 31, a ring partition member 35 for partitioning the interior of the housing 31 into two combustion chambers 33, 34, respective filters 36 mounted in the housing 31, gas generants 37 packed in the respective combustion chambers 33, 34, ignitor devices 38, 39 for spouting flames into the combustion chambers 33, 34 respectively and enhancer devices 40, 41 for propagating the flames of the ignitor devices 38, 39 respectively.

The housing 31 has a single cylinder structure formed by an upper casing 42 and a lower casing 43. As concerns the housing 31, the upper and lower casings 42 and 43 are joined to each other by butt welding (e.g. friction welding), whereby, an upper end and a lower end of an outer cylinder 44 are respectively closed by two cover plates 46, 47. Accordingly, a closed space S is formed in the interior of the housing 31.

The outer cylinder 44 of the housing 31 has a plurality of gas discharge holes 44a so as to communicate between the closed space S and the interior of the airbag. The gas discharge holes 44a open in the outer cylinder 44 on the upper cover plate 46 side and are arranged apart from each other by a predetermined space along a circumferential direction of the housing 31. The gas discharge holes 44a are closed by (a) burst plate(s) 48 stuck on the internal circumferential surface of the outer cylinder 44. For example, the burst plate 48 is formed from a metal foil such as aluminum. And the burst plate 48 serves as moisture-proof and inner pressure adjustment of the housing 31.

Two long and short inner cylinders 45, 49 are integrally formed on the lower cover plate 47 of the housing 31 so as to project into the closed space S. The respective inner cylinders 45, 49 is eccentrically disposed in a radial and outward direction so as to be asymmetrical with respect to the axis "a" of the housing 31. As an example of another arrangements, the respective inner cylinders 45, 49 may be point symmetrically disposed with respect to the axis "a" of the housing 31. A flanged cylinder 50 is formed on an external circumferential edge of the lower cover plate 47 so as to extend toward the upper cover plate 46 along a side surface of the outer cylinder 44 on the outer diameter side. A retainer or equivalent of the airbag module comprising the airbag and a bag cover is attached to a flange 51 of the flanged cylinder 50.

The partition member 35 is fitted around the external circumferential surface of the long inner cylinder 45 in substantial parallel with the cover plates 46, 47. The partition member 35 together with the outer cylinder 44 and the cover plates 46, 47 partitions the closed space into the two upper and lower partitioned spaces S4, S5 in a specified volume proportion.

The partitioned spaces S4, S5 communicate with each other through the space between an external circumferential surface of the ring partition plate 35 and the internal circumference surface of the outer cylinder 44.

The filters 36 are mounted in the partitioned spaces S4, S5 respectively. The filter 36 can be formed, for example, by forming an aggregation of a stockinet wire netting, a plainwoven wire netting or crimped metal wire materials into a cylindrical shape. Thereby the filter 36 can be produced at a low price. The each filter 36 is disposed in the space between the outer cylinder 44 and the short inner cylinder 49. In the partitioned space S4, one of filters 36 extends from the ring partition plate 35 to a vicinity of the upper cover plate 46. In the partitioned space S5, other of filters 36 extends from the lower cover plate 47 to the ring partition plate 35. The filter 36 set in the partitioned space S4 is closed at a top end thereof by another cover plate 52. The filter 6 and the ring partition plate 35 together with the cover plate 52 partition the partitioned spaces S4, S5 into the gas passage space S2 (annular space) on the outer cylinder 44 side and the combustion chambers 33, 34 on the inner cylinder 45, 49 side.

The gas generants 37, which generate high temperature gas by combustion, are packed in the combustion chambers 33, 34 respectively. The packing amount of the gas generants 37 is adjusted in advance so that the expansion and inflation of the airbag can be controlled.

The ignitor devices 38, 39 are mounted in the inner cylinders 45, 49 respectively. The ignitor devices 38, 39 consist of only ignitors 53, 54 respectively, The each ignitor 53, 54 is the electric type which ignites by an electric current in accordance with collision signals from a collision detecting sensor. The each ignitor 53, 54 is disposed in the inner cylinder 45, 49 so as to project into the combustion chamber 33, 34, then fixed thereto by crimping lugs 55 projecting from the inner cylinder 45, 49 into the combustion chamber 33, 34. The each ignitor device 38, 39 is disposed on the radially outwardly eccentric position with respect to the axis "a" of the housing 31. The each ignitor device 38, 39 spouts the flames toward the cover plate 52 or the ring partition plate 35 and a space around the external circumferential surface of the long or short inner cylinder 45,49. Thereby, the gas generants 37 packed in the each combustion chamber 33, 34 are ignited and burned.

The enhancer device 40, 41 are mounted in the combustion chambers 33, 34 respectively. The enhancer device 40 consists of a circular plate made of enhancer agents and is fitted in along the internal circumferential surface of filter 36. The enhancer device 40 is arranged between the ignitor device 38 and the cover plate 52 in substantially parallel with the cover plate 52. The enhancer device 40 confronts a top surface of the ignitor 53 disposed on the eccentric position and extends in the circumferential direction and the radial direction of the housing 31 in directly contact with the gas generants 37 packed in the combustion chamber 33. The enhancer device 40 propagates the flames spouted out from the ignitor 53 around the axis "a" of the housing 31 and toward the outer cylinder 44.

The enhancer device 41 consists of a ring-shaped plate made of the enhancer agents and is fitted between the internal circumference surface of the filter 36 and the outer circumferential surface of the long inner cylinder 45. The enhancer device 41 is placed between the ring partition plate 35 and the ignitor device 39 in substantially parallel with the ring partition plate 35. The enhancer device 41 contacts with the top end of the ignitor 54 disposed eccentrically and directly with the gas generants 37 packed in the combustion chamber 34. And the enhancer device 41 extends in the circumferential direction and the radial direction and propagates the flames spouted out from the ignitor 54 around the axis "a" of the housing 31 and toward the outer cylinder 44. As well as the case of the gas generator D1, an explosive composition which includes nitrogen-containing organic compounds as fuel and has auto-ignition function, is preferably used as the enhancer agents of the each enhancer device.

The operation of this gas generator D5 will be easily understood from what have been described on the gas generators D1–D4.

Since the gas generator D5 is structured so that the housing 31 may have a single cylinder structure, the structure of the gas generator D5 is simplified as compared with the double cylinder structure adopted in the gas generators D1–D4. Therefore, manufacturing costs can be reduced. Preferably, the housing 31 comprises the casings 42, 43 made of stainless steel plates by means of press-molding. The housing 31 formed from stainless steel is superior in heat resistance and pressure resistance to the housing formed from aluminum alloy and the like. When the housing 31 having excellent heat resistance and pressure resistance is used, the non-azide gas generants that are being increasingly used in recent years can be used as a substitute for the azide gas generants that have been used so far. Since the non-azide gas generants have the property of easily producing high temperature and high pressure gas as compared with the azide gas generants, the housing 31 is required to have high heat resistance and pressure resistance. This requirement can be supplied easily by use of the housing 31 having the single cylinder structure formed from stainless steel plates or equivalent.

Next, reference will be made to the gas generator D6 shown in FIGS. 11 and 12.

Figure 11:
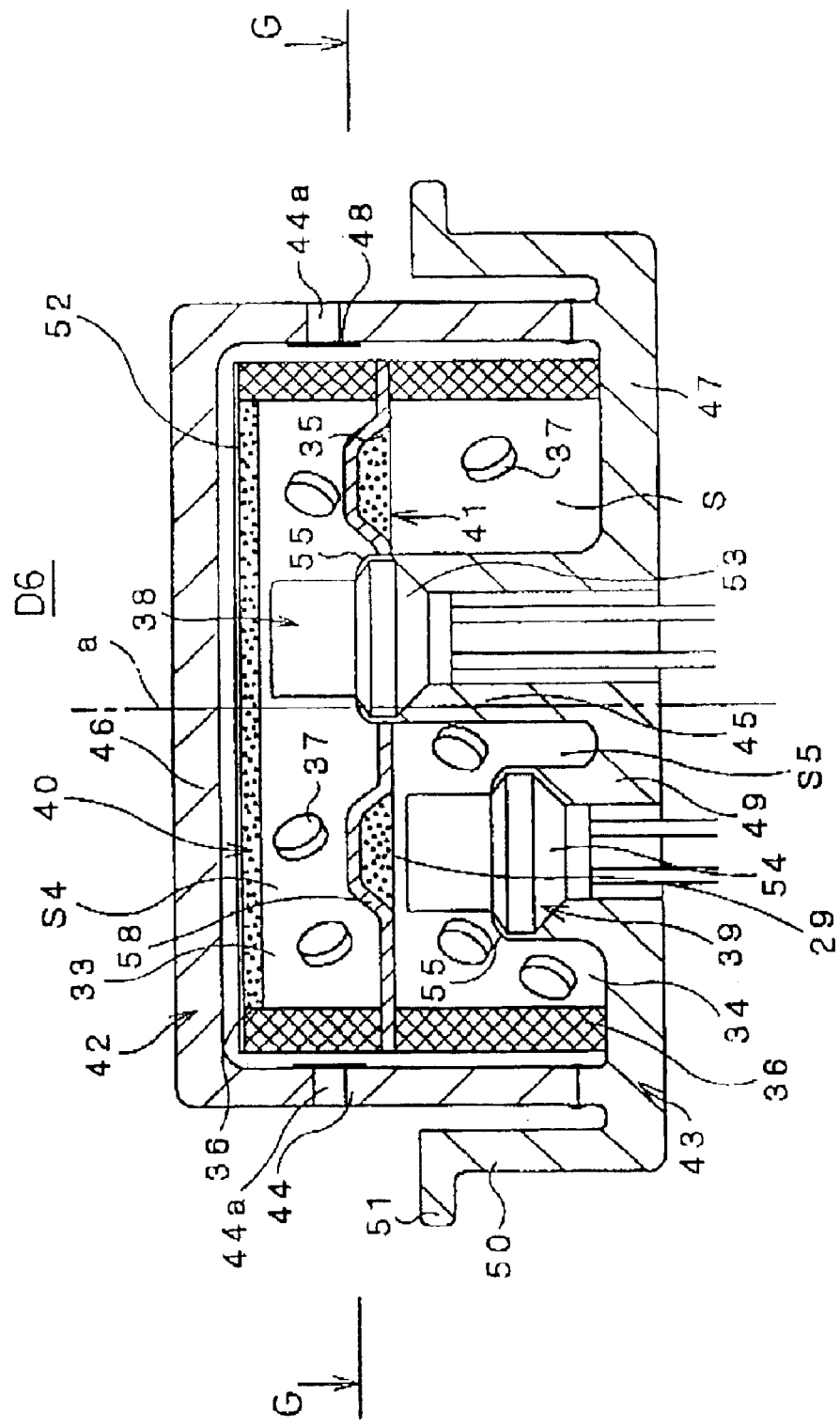
FIG. 11 is a sectional view of a gas generator of the sixth embodiment according to the present invention.
Figure 12:
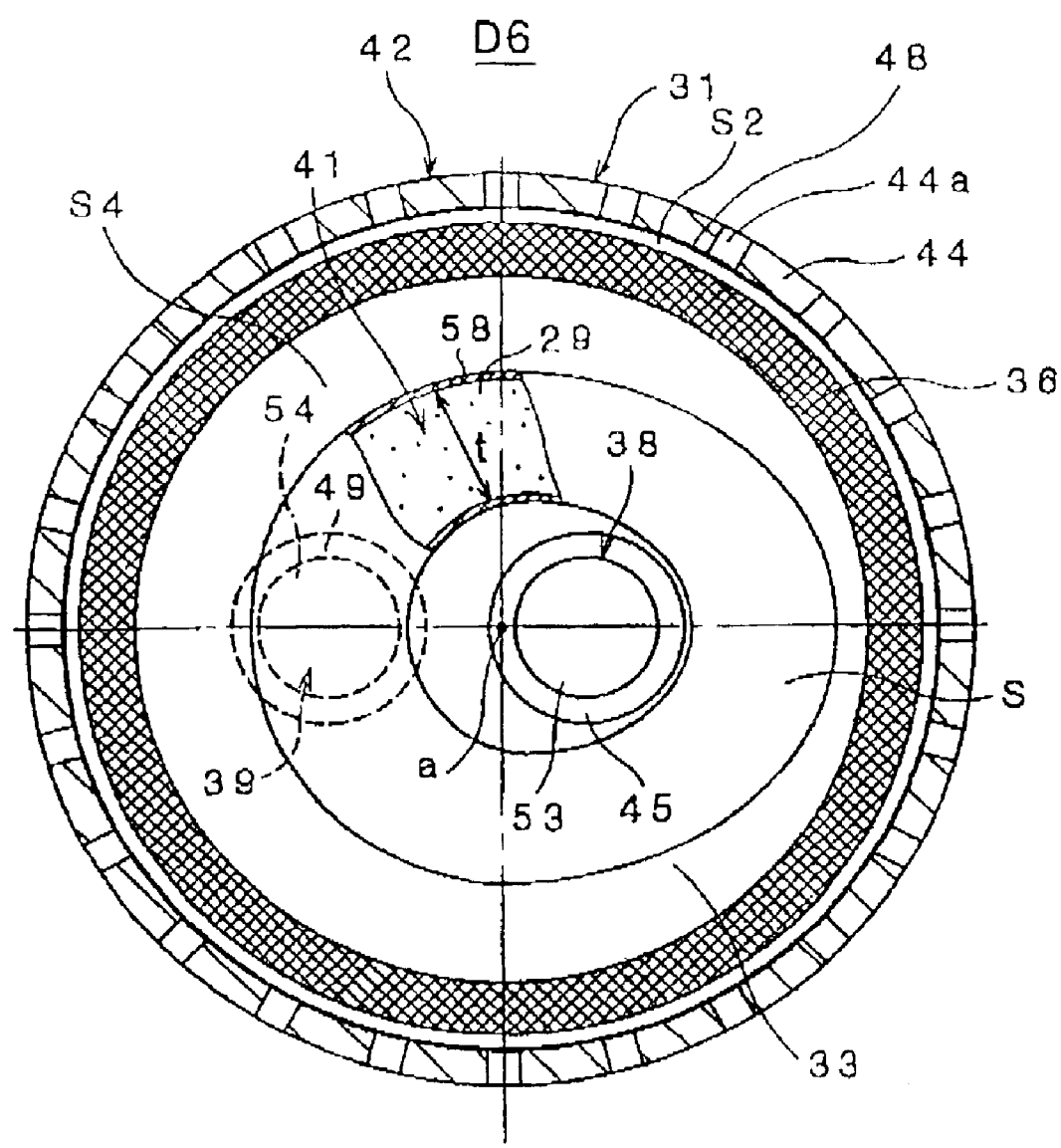
FIG. 12 is a diagram taken along arrowed line G—G of FIG. 11.

The gas generator D6 shown in FIGS. 11 and 12 is different from the gas generator D5 in the following point. In the gas generator D6, the enhancer device 41 and the ring partition plate 35 are integrally formed. The same reference characters as those of FIGS. 9 and 10 show the same elements as those of FIGS. 9 and 10. Therefore, explanations about them are omitted.

In the gas generator D6 of FIGS. 11 and 12, the enhancer agents of the enhancer device 41 are loaded In the interior of the ring partition member 35 so as to be integrated with the ring partition member 35 already described in the FIGS. 3 and 4. An annular enhancing groove 58 is formed in the ring partition member 35 so as to be charged with the enhancer agents therein and sealed tight by the metal plate 29. The enhancing groove 58 confronts the top end of the ignitor 54 of the ignitor device 39 and extends along the outer circumferential surface of the long inner cylinder 45 placed on a periphery of the axis "a" of the housing 1. Structures of remaining parts are the same structures as described in FIGS. 9 and 10.

The operation of this gas generator D6 will be fully understood from what have been described on the gas generators D1–D4.

Figure 13:
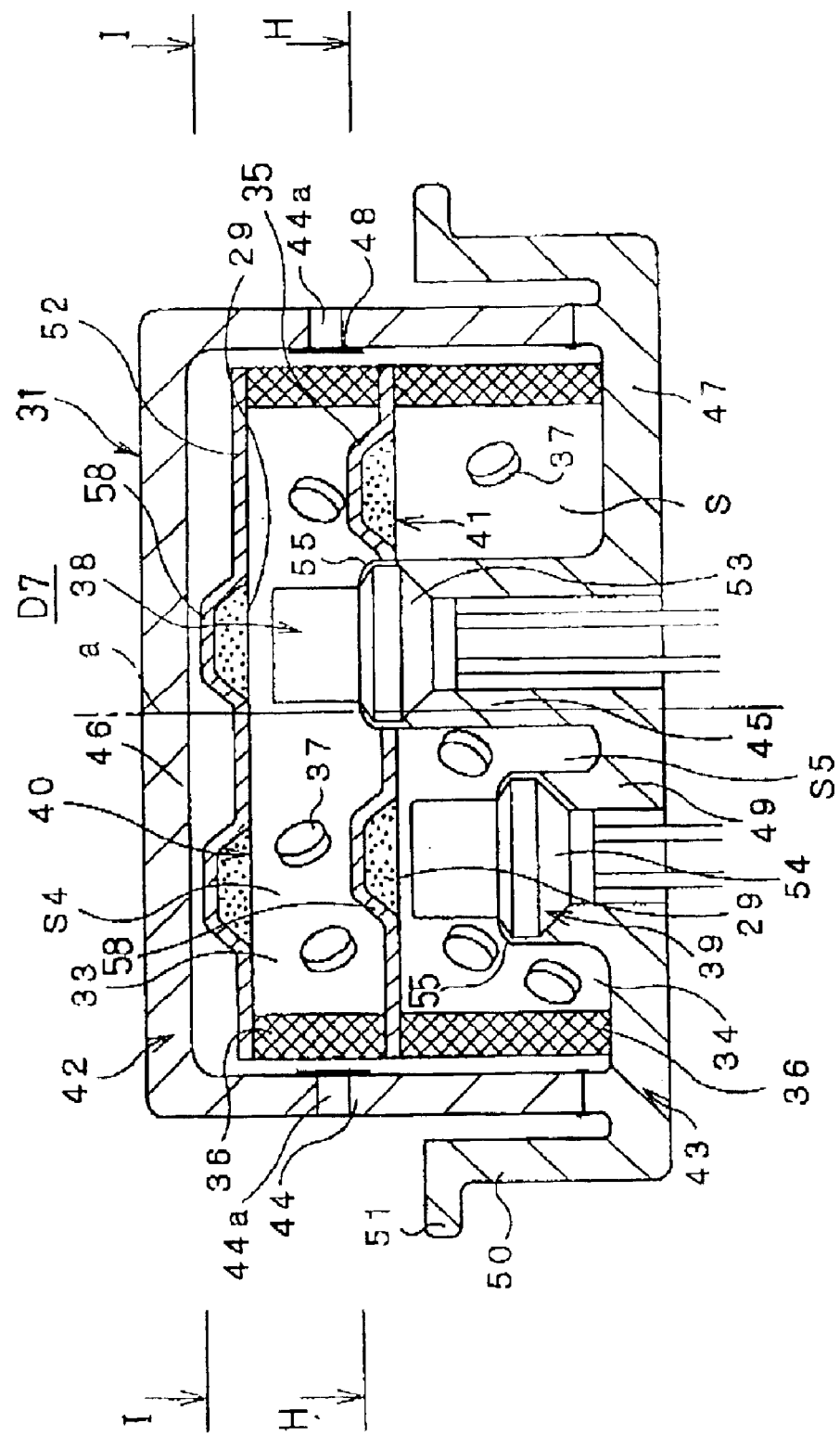
FIG. 13 is a sectional view of a gas generator of the seventh embodiment according to the present invention.
Figure 14:
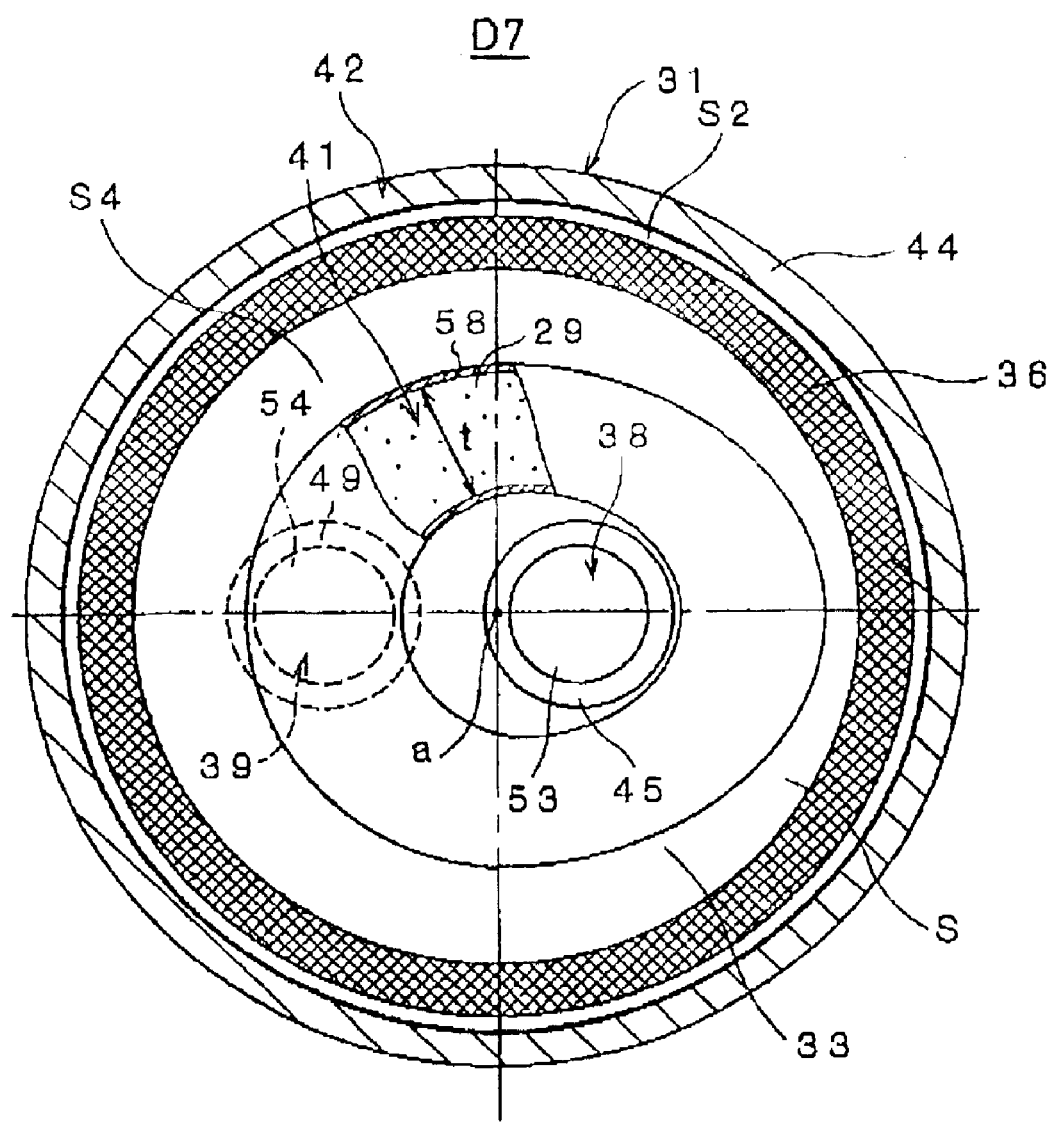
FIG. 14 is a diagram taken along arrowed line H—H of FIG. 13.
Figure 15:
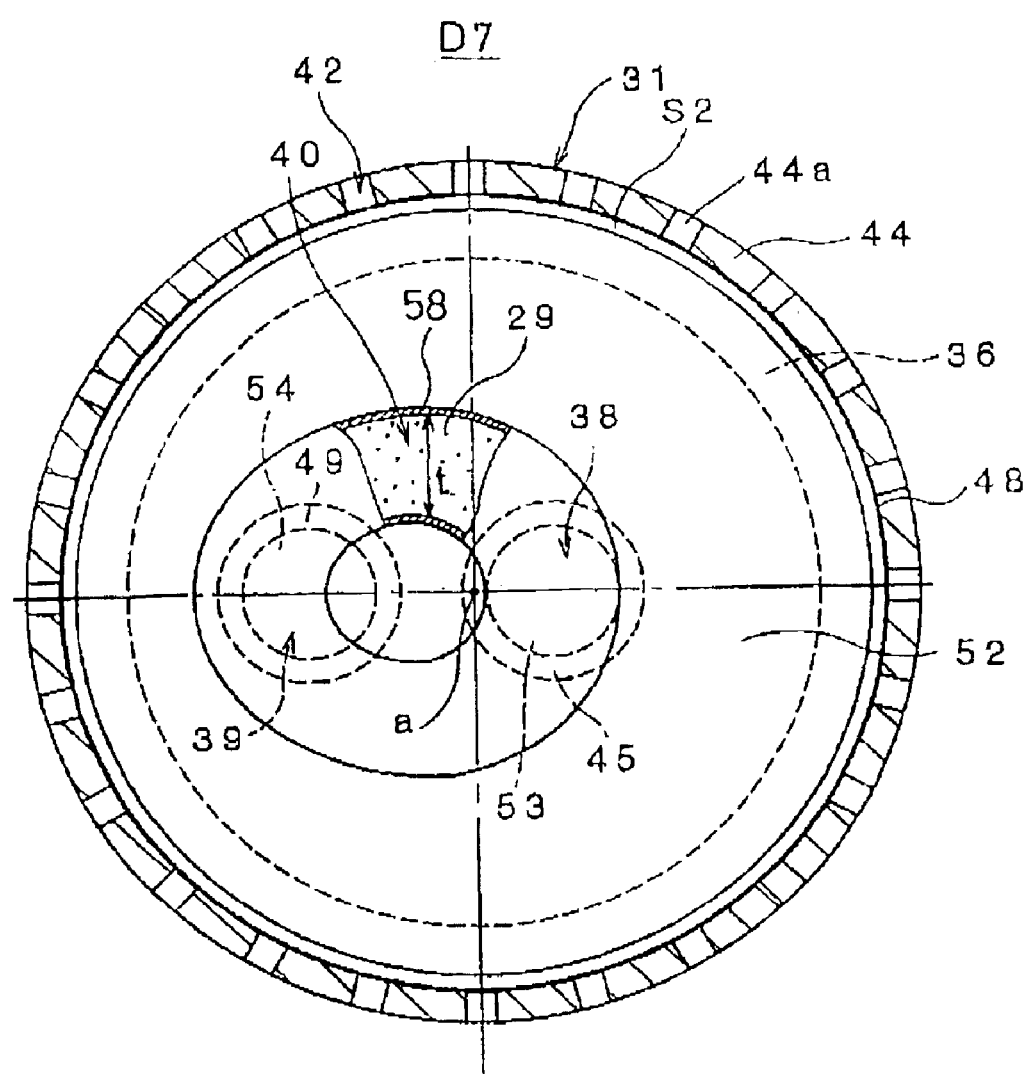
FIG. 15 is a diagram taken along arrowed line I—I of FIG. 13.

The gas generator D7 shown in FIGS. 13–15 is different from the gas generator D6 in the following point. In the gas generator D7, the enhancer device 40 and the cover plate 52 are integrally formed. Structures of remaining parts are the same structures as described in FIGS. 11 and 12. The same reference characters as those of FIGS. 11 and 12 show the same elements as those of FIGS. 11 and 12.

The operation of this gas generator D7 will be fully understood from what have been described on the gas generators D5 and D6.

Figure 16:
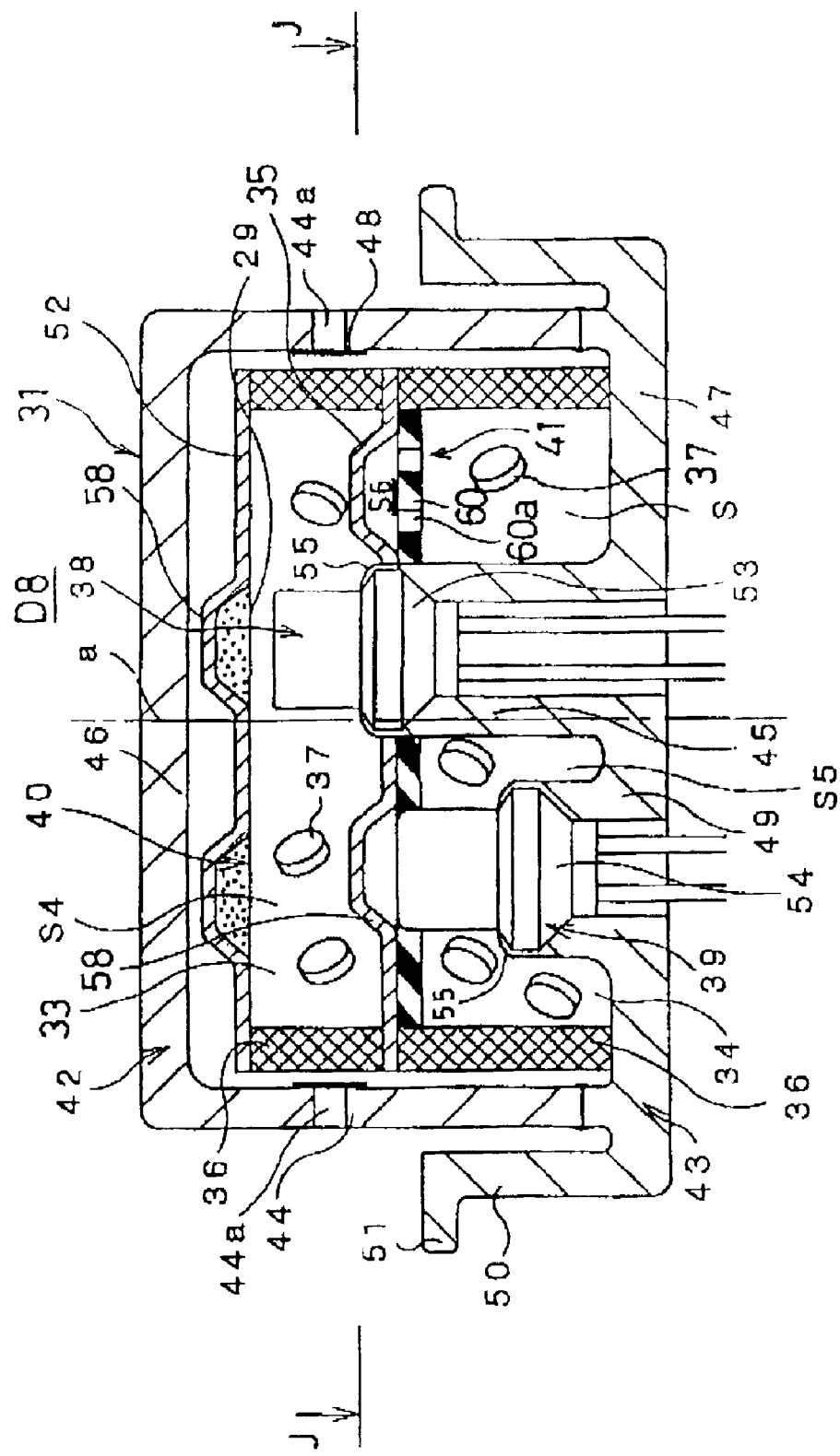
FIG. 16 is a sectional view of a gas generator of the eighth embodiment according to the present invention.
Figure 17:
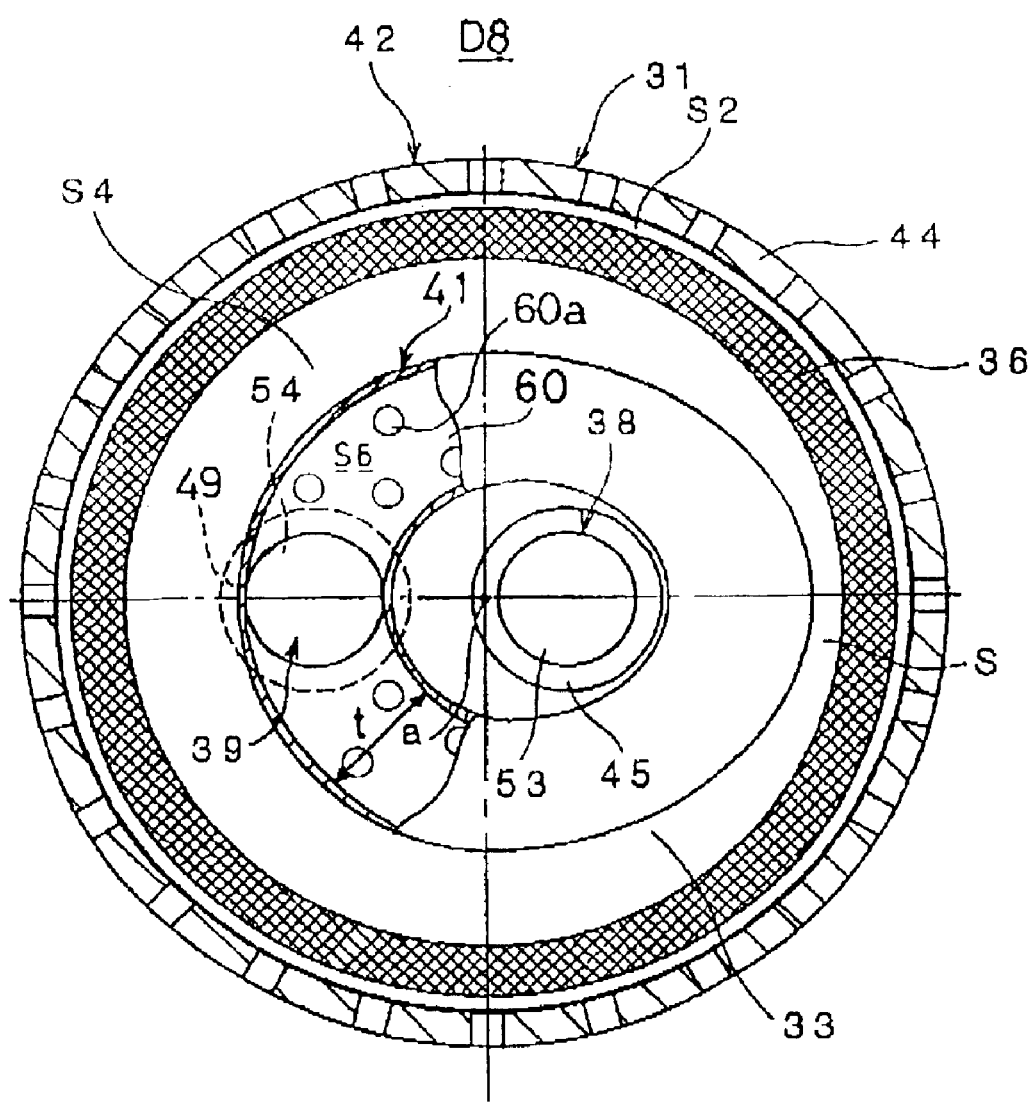
FIG. 17 is a diagram taken along arrowed line J—J of FIG. 16.

Further, the gas generator D8 shown in FIGS. 16, 17 is different from the gas generator D7 in the following point. In the gas generator D8, the enhancer device 41 comprises the enhancing groove 58 and a cushioning member 60. In FIGS. 16, 17, the same reference characters as those of FIGS. 13 and 15 show the same elements as those of FIGS. 13 and 15. Therefore, explanations about them are omitted.

As already described in the FIGS. 5–7, the annular enhancing space S6 constructing the enhancer device 41 is formed by the cushioning member 60 and the enhancing groove 58 without charged enhancer agents. The cushioning member 60 is fitted between the ring partition member 35 and the gas generants 37 in the combustion chamber 34. The cushioning member 60 abuts the ring partition member 35 so as to shut out the interior space of the enhancing groove 58 from the combustion chamber 34 side. The annular enhancing space S6 is defined by the cushioning member 60 and an inside surface of the enhancing groove 58. The enhancing space S6 extends along the external circumferential surface of the long inner cylinder 45 placed in the periphery of the axis "a" of the housing 1 in accordance with the configuration of the enhancing groove 58. The top end portion of the ignitor 54 is fitted in the cushioning member 60 so as to be exposed in the enhancing space S6. The cushioning member 60 has a plurality of enhancing holes 60a so that the enhancing space S6 may open toward the combustion chamber 34. The enhancing holes 60a are arranged along the annular enhancing space S6 and communicate between the enhancing space S6 and the combustion chamber 34. A diameter of the each enhancing hole 60a is set so that the gas generants 37 may not enter the enhancing space S6 therethrough. As already described in the gas generator D3, it is preferable that materials such as ceramic sheets having the heat insulating property (e.g. ceramic fiber sheets and the like) or elastic materials (e.g. silicone foam materials and the like) are used as the cushioning member 30.

The operation of this gas generator D8 will be easily understood from what have been described on the gas generators D3 and D6.

Next, reference will be made to the gas generator D9 shown in FIGS. 18 and 19.

Figure 18:
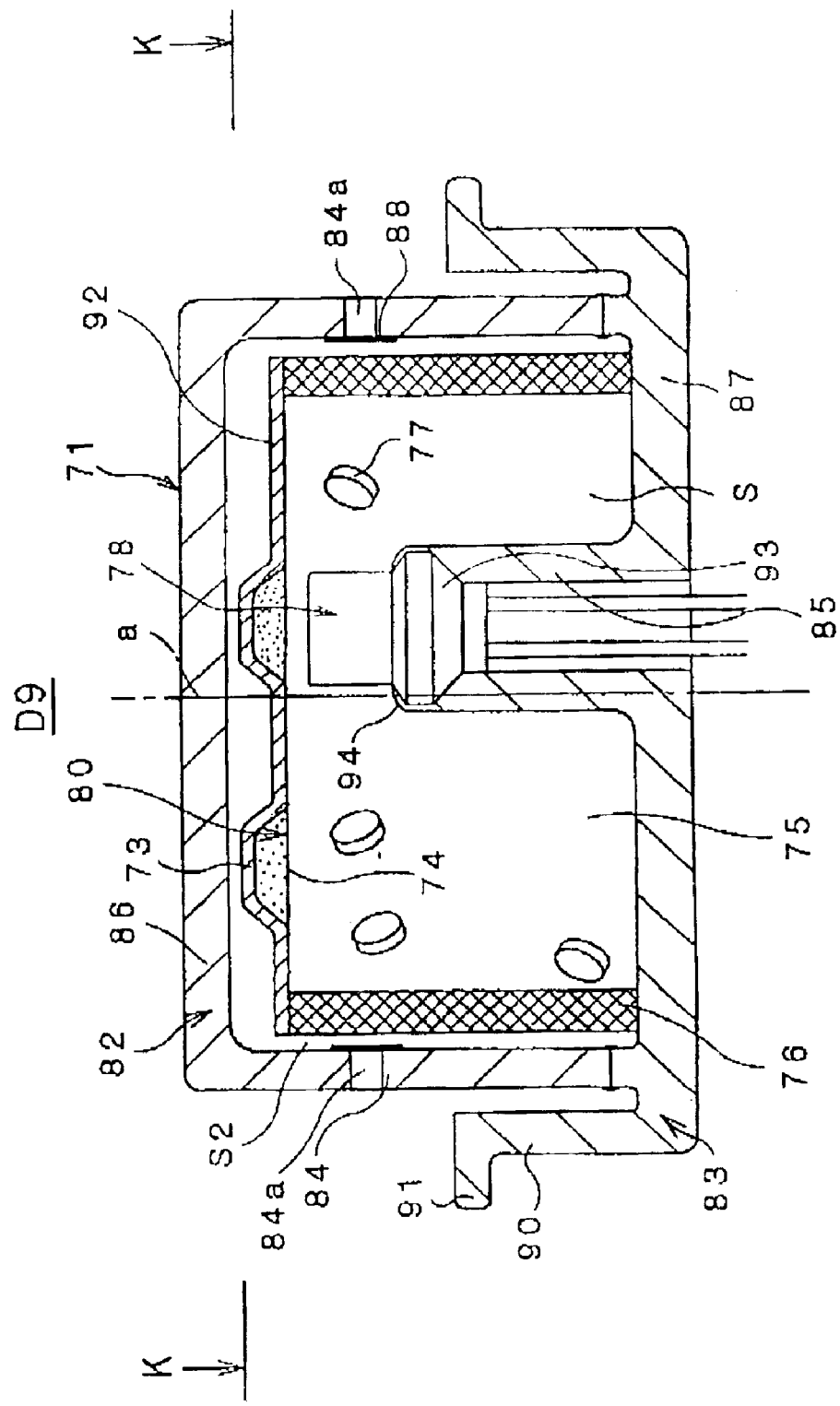
FIG. 18 is a sectional view of a gas generator of the ninth embodiment according to the present invention.
Figure 19:
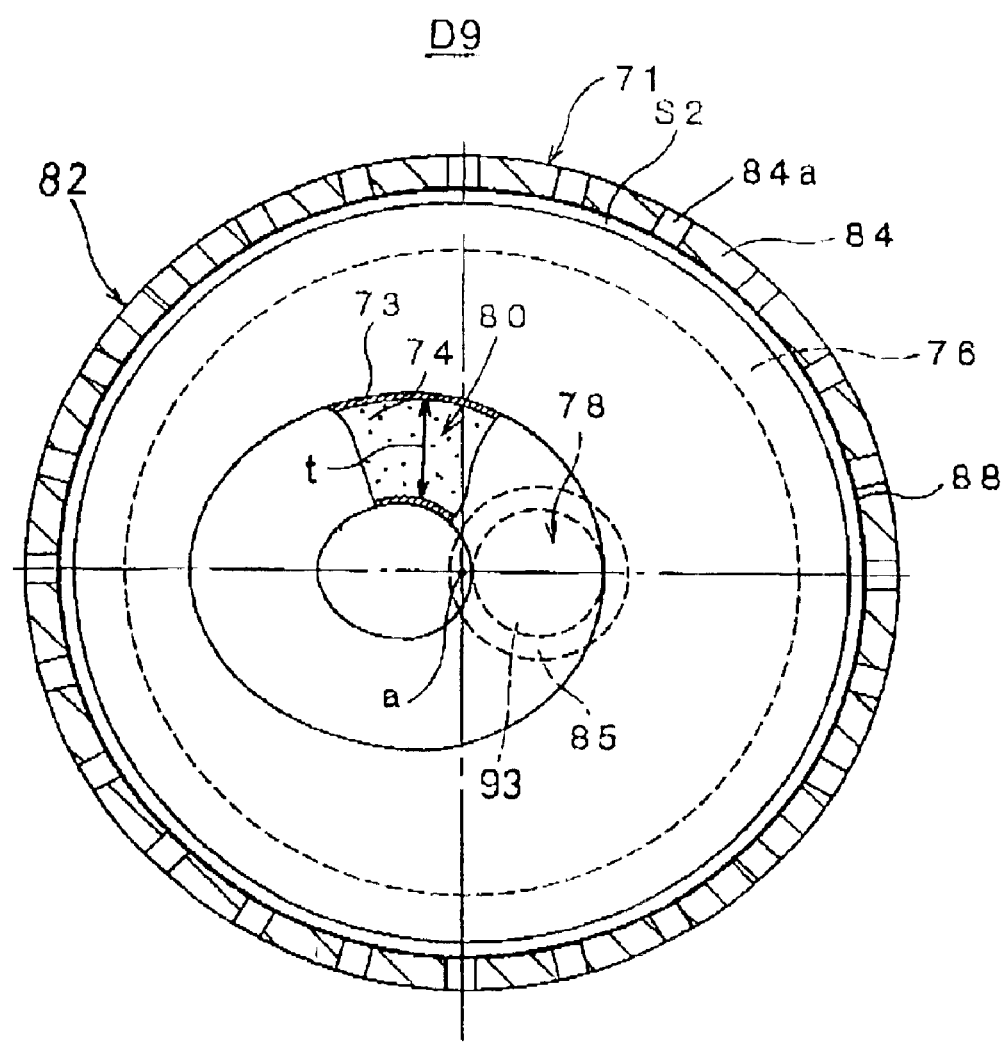
FIG. 19 is a diagram taken along arrowed line K—K of FIG. 18.

The gas generator D9 shown in FIGS. 18 and 19 is different from the gas generators D1–D8 in the following point. In the gas generator D9, only one ignitor device 78 is used to burn the gas generants 77 and the ignitor device 78 is eccentrically disposed with respect to the axis "a" of the housing 71.

The gas generator D9 shown in FIGS. 18 and 19 comprises a short cylindrical housing 71, a filter 76 mounted in the housing 71, gas generants 77 packed in the housing 71, an ignitor device 78 for spouting flames into the housing 71 and an enhancer device 80 for propagating the flames of the ignitor device 78.

The housing 71 has a single cylinder structure formed by an upper casing 82 and a lower casing 83. In the housing 71, the casings 82 and 83 are joined to each other by butt welding (e.g. friction welding), whereby, upper and lower ends of an outer cylinder 84 can be respectively closed by two cover plates B6, 87. Accordingly, the closed space S is formed in the interior of the housing 71.

The outer cylinder 84 of the housing 71 has a plurality of gas discharge holes 84a for communicating between the closed space S and the interior of the airbag. The gas discharge holes 84a open on the upper cover plate 86 side of the outer cylinder 84 and are arranged apart from each other by a predetermined space in a circumferential direction of the housing 71. The each gas discharge holes 84a is closed by a burst plate 88 stuck on an internal circumferential surface of the outer cylinder 84. The burst plate 88 is formed from, for example, a metal foil such as aluminum. The burst plate 88 serves as moisture-proof and inner pressure adjustment of the housing 71.

A long inner cylinder 85 is integrally formed on the lower cover plate 87 of the housing 71 so as to project into the closed space S. The inner cylinder 85 is eccentrically disposed in radial and outward direction with respect to the axis "a" of the housing 71. A flanged cylinder 90 is formed on an external circumferential edge of the lower cover plate 87 so as to extend toward the upper cover plate 86 along a side surface on the outer diameter side of the outer cylinder 84. A retainer or equivalent of the airbag module comprising the airbag and a bag cover is attached to a flange 91 of the flanged cylinder 90. A retainer or equivalent of the airbag module comprising the airbag and a bag cover is attached to a flange 91 of the flanged cylinder 90.

The filter 76 is mounted in the closed space S of the housing 71. The filter 76 can be formed, for example, by molding an aggregation of a stockinet wire netting or crimped metal wire materials Into a cylindrical shape, whereby the filter 76 can be produced at a low price. The filter 76 is coaxially disposed with respect to the axis "a" of the housing 71 and extends from the lower cover plate 87 to a vicinity of the upper cover plate 86. A top end of the filter 76 is closed by another cover plate 92. The filter 76 together with the lower cover plate 87 and the cover plate 92 partitions the closed spaces S into the gas passage space S2 (annular space) on the outer cylinder 84 side and the combustion chamber 75 on the long inner cylinder 85 side. An annular enhancing groove 73 is formed in the cover plate 92 so as to store the enhancer agents. The enhancing groove 73 is formed at an eccentric position with respect to the axis "a" of the housing 71 so as to confront the top end of the ignitor device 78. The enhancing groove 73 opens in the combustion chamber 75 at a predetermined open width "t" and projects toward the upper cover plate 86 side at a predetermined depth. The gas generants 77, which generate high temperature gas by combustion, are packed in the combustion chamber 75.

The ignitor device 78 is installed in the long inner cylinder 85. The ignitor device 78 consists of only an ignitor 93. The ignitor 93 is the electric type which ignites by an electric current flowing in accordance with collision signals from the collision detecting sensor. The ignitor 93 is mounted in the long inner cylinder 85 so as to project into the combustion chamber 75. The ignitor 93 is fixed by crimping lugs 94 projecting from the long inner cylinder 85 into the combustion chamber 75.

The ignitor device 78 is eccentrically disposed in a radial and outward direction with respect to the axis "a" of the housing 71. The ignitor device 78 spouts flames toward the cover plate 92 and a surrounding space around the long inner cylinder 85 then ignites and burns the gas generants 77 packed in the combustion chamber 75.

The enhancer device 80 is provided in the combustion chamber 75 and comprising the enhancer agents. As well as the case of the gas generator D1, an explosive composition which includes nitrogen-containing organic compounds as fuel and has auto-ignition function, is preferably used as the enhancer agents of the enhancer device. The enhancer agents of the enhancer device 80 are stored in the interior of the enhancing groove 73 of the cover plate 92 so as to extend in circumferential direction and the radial direction of the combustion chamber 75. The enhancing groove 73 with the enhancer agents of the enhancer device 80 therein is tightly sealed by a metal plate 74 stuck to the cover plate 92. The metal plate 74 is, for example, formed from a metal foil such as an aluminum foil into a ring-shaped form and closes the enhancing groove 73 on the combustion chamber 75 side. The metal plate 74 is burst by the flames spouted out from the ignitor 93 so that the enhancer agents of the enhancer device 80 can be ignited by the flames. The enhancer device 80 is indirectly contact with the gas generants 77 through the metal plate 74 in the combustion chamber 75.

Now, operation of the gas generator D9 will be described.

When a vehicle collision is detected by a collision sensor, the ignitor 93 ignites by an electric current. The flames of the ignitor 93 are spouted toward a surrounding space around the long inner cylinder 85 so as to burn the gas generants 77 and are simultaneously spouted toward the cover plate 92 so as to burst the metal plate 74, after that, Ignite the enhancer agents of the enhancer device 80. Thus, the flames of the ignitor 93 are transferred to the enhancer agents of the enhancer device 80 and are propagated in the circumferential direction and the radial direction of the housing 71. And the gas generants 77 are burned then high temperature gas generates. At this time, the flames transferred to the enhancer agents of the enhancer device 80 run along the configuration of the enhancing groove 73 and are propagated from the top end of the ignitor 93 to a side opposite to the eccentric side. A thickness of the metal plate 74 is set so as to be burst by the combustion of the enhancer agents.

Thus, the combustion in the combustion chamber 75 are instantaneously spread in the circumferential direction and the radial direction of the housing 71 by the flames spouted from the ignitor 93 directly into the combustion chamber 75 and the flames propagated via the enhancing groove 73 of the cover plate 92 and the enhancer device 80. Consequently, the combustion in the combustion chamber 75 broadens all over the whole of gas generants.

Accordingly, in the combustion chamber 75, no local combustion occurring in the vicinity of the ignitor device 78 eccentrically disposed, And, the gas can be uniformly generated all over the whole of the housing 71. The airbag can be smoothly and uniformly expanded and inflated by a large amount of gas generated in the combustion chamber 75 without any partial expansion and inflation.

In addition, the gas generator D9 is preferable for use of the non-azide gas generants because of having the housing 71 of a single cylinder structure as well as the case of the gas generator D9.

Figure 20:
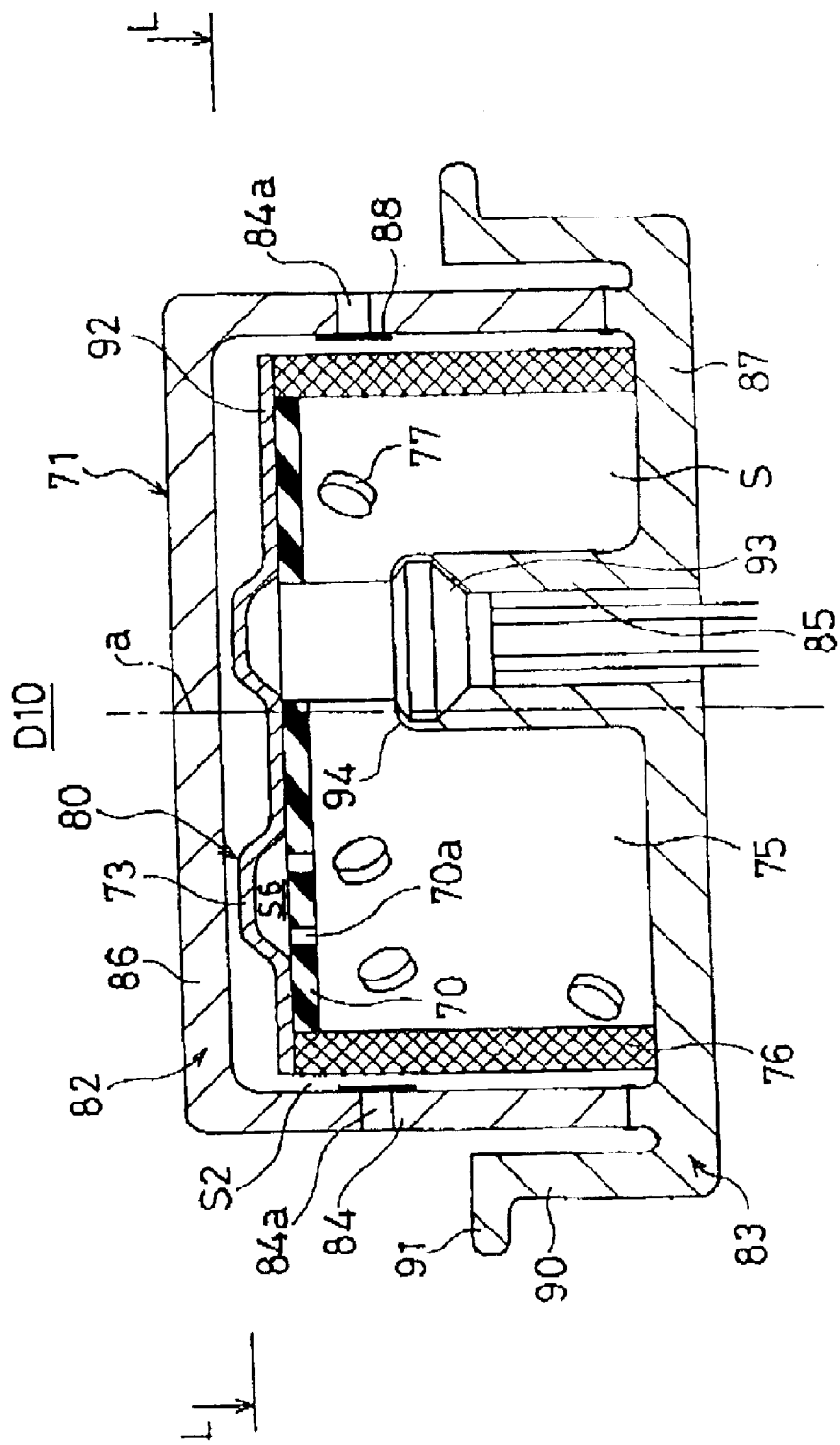
FIG. 20 is a sectional view of a gas generator of the tenth embodiment according to the present invention.
Figure 21:
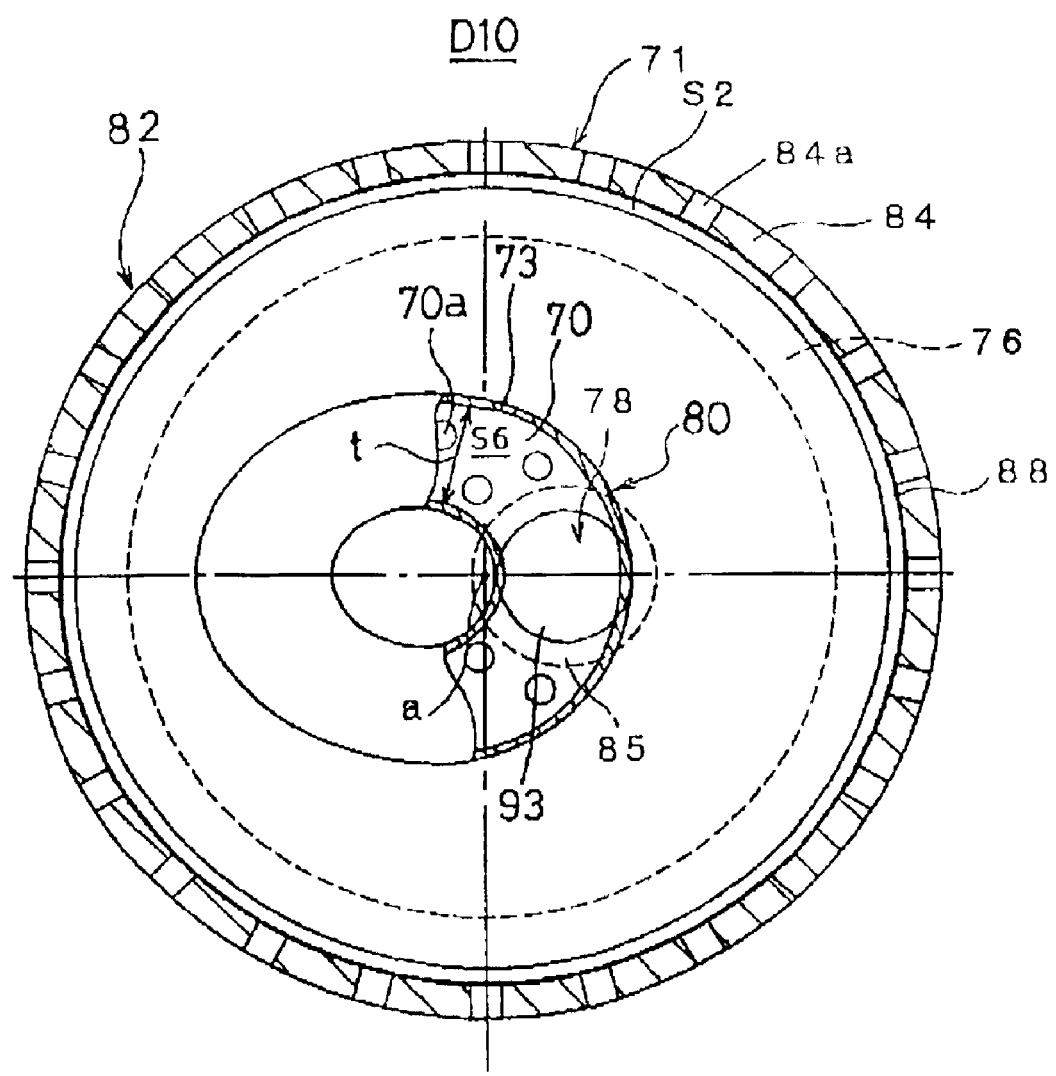
FIG. 21 is a diagram taken along arrowed line L—L of FIG. 20.

Next, the gas generator D10 of FIGS. 20 and 21 is different from the gas generator D9 in the following point. An annular enhancing space S6 constructing the enhancer device 41 is formed by the cushioning member 70 and the enhancing groove 73 without charged enhancer agents. The same structure as the enhancer device 41 of the gas generator D3 as previously mentioned is applied. Structures of remaining parts are the same structures as described in FIGS. 18 and 19. In FIGS. 20 and 21, the same reference characters as those of FIGS. 18 and 19 show the same elements as those of FIGS. 18 and 19. The cushioning member 70 has a plurality of enhancing holes 70a so that the enhancing space S6 may open into the combustion chamber 75. The enhancing holes 70a are arranged along the annular enhancing space S6. As already described in the gas generator D3, materials such as ceramic sheets having the heat insulating property (e.g. ceramic fiber sheets and the like) or elastic materials (e.g. silicone foam materials and the like) are used as the cushioning member 70.

The operation of the enhancer device of the gas generator D10 is the same as the enhancer device 41 of the gas generator D3. The flames of the ignitor 93 are propagated in the circumferential direction and the radial direction of the housing 1 through the enhancing space S6. The combustion In the combustion chamber 75 broadens all over the whole of the combustion chamber 75.

Figure 22:
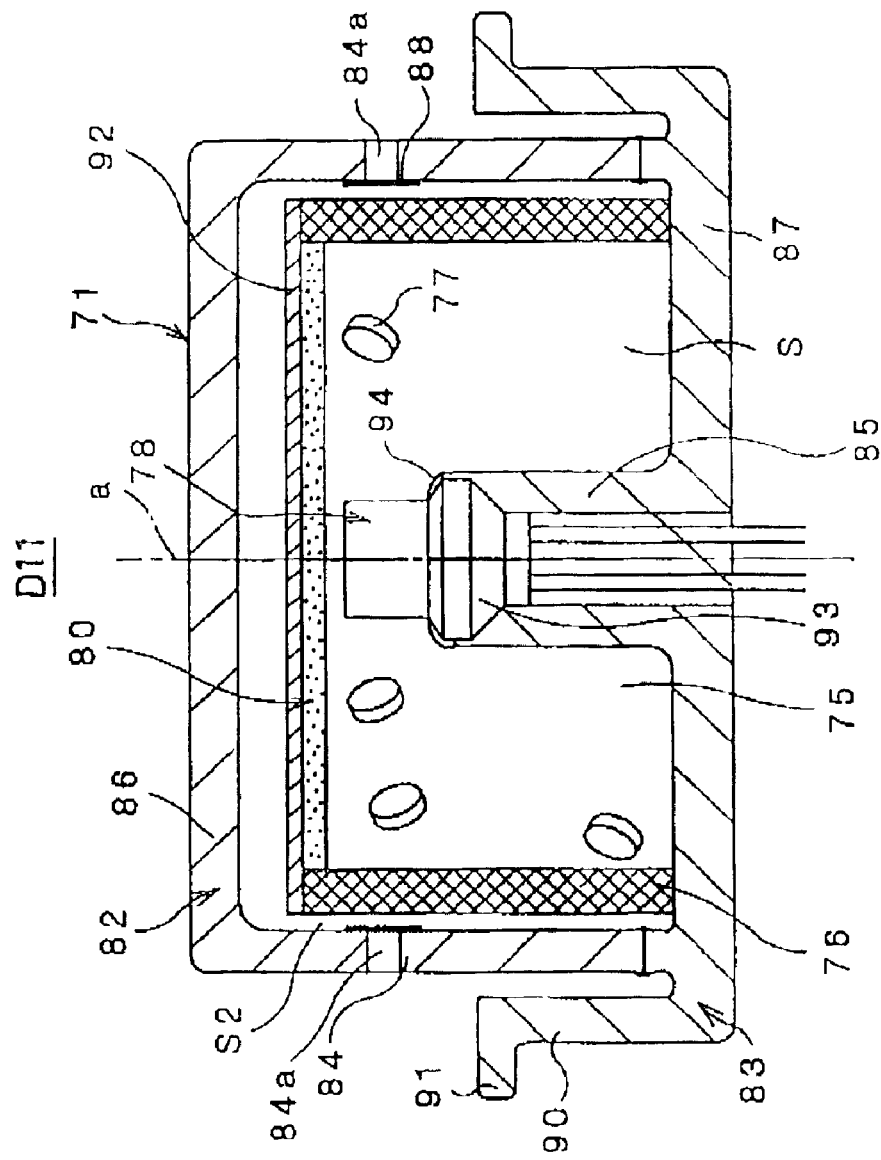
FIG. 22 is a sectional view of a gas generator of the eleventh embodiment according to the present invention.

Next, the gas generator D11 of FIGS. 22 is different from the gas generator D9 in the following point. The ignitor device 78 is coaxially mounted with respect the axis "a" of the housing 71 and also the enhancer device 80 is separated from the cover plate 92. The same structures as the enhancer device 40 and the cover plate 52 of the each gas generators D5, D6 previously described are applied. Structures of remaining parts are the same structures as described in FIGS. 18 and 19. In FIG. 22, the same reference characters as those of FIGS. 18 and 19 show the same elements as those of FIGS. 18 and 19.

The operation of the gas generator D11 is the same operation as the gas generator D9.

Figure 23:
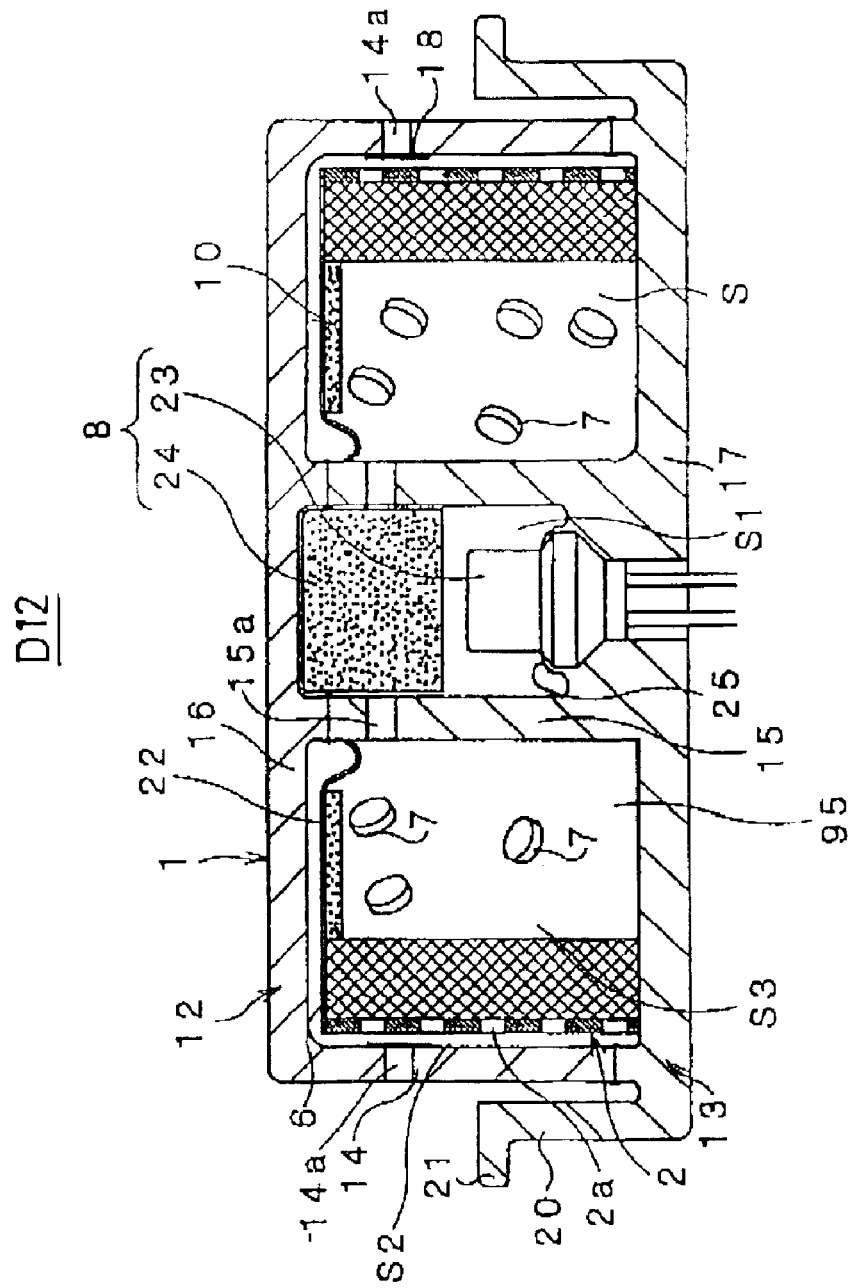
FIG. 23 is a sectional view of a gas generator of the twelfth embodiment according to the present invention.

Finally, the gas generator D12 of FIG. 23 is different from the gas generator D1 in the following point.

In the gas generator D12, only single ignitor device 8 for burning the gas generants 7 and only single combustion chamber 95 are provided in the housing 1 without such provisions as the short inner cylinder 19 and the ring partition plate 5 for partitioning the combustion space S3 inside the filter 6. Structures of remaining parts are the same structures as described in FIG. 1. In FIG. 23, the same reference characters as those of FIG. 1 show the same elements as those of FIG. 1.

The operation of the gas generator D12 is as follows. When vehicle collision is detected by the collision sensor, the ignitor 23 ignites then the enhancer agents 24 ignite. The flames of the enhancer agents 24 are spouted from the flame leading holes 15a into the combustion chamber 95. The spouted flames ignite and burn the gas generants 7 and simultaneously ignite the enhancer agents of the enhancer device 10. Thus, the flames of the ignitor 23 are transferred to the enhancer agents of the enhancer device 10 and are propagated in the circumferential direction and the radial direction of the combustion chamber 95, whereby, the gas generants 7 burn then high temperature gas is generated. The combustion in the combustion chamber 95 broadens all over the whole of the gas generants 7 instantaneously by the flame spouted into the combustion chamber 95 and the flames propagated by the enhancer device 10.

Therefore, in the combustion chamber 95, there is no partial combustion and the gas can be uniformly generated all over the whole in the housing 1. The airbag can be smoothly expanded and inflated by a large amount of gas generated in the combustion chamber 95 without any partial expansion and inflation of the airbag.

In the gas generators D1–D12 of the present invention, their individual structures of the enhancer devices 10, 11, 40, 41 and 80 described thereon may be mutually applied among them.

In case of the plate type enhancer device including a ring-like plate shape and a plate-like shape, an optimum enhance property for burning the gas generants can be obtained by properly changing a thickness of the plate type enhancer device. An optimum amount of enhancer agent for burning the gas generants and an optimum enhancing space for transferring the flames of the ignitor can be obtained by properly selecting the dimensions such as width and depth of the enhancing groove of the ring partition plate or cover plate in the housing. Further, the enhance property of the enhancer device can be changed by properly changing the components of the enhancer agent.

It is not always necessarily for the enhancer device to extend over around the entire circumference. The enhancer may be formed in any shape to transfer the flames of the ignitor device in the circumferential direction and radial direction. For example, the enhancer device may be formed in U-shape.

Further, the enhancing space S6 of the enhancer device may be formed by the enhancing groove only, without limiting to the combination of the enhancing groove and the cushioning member.

While in the gas generators D1–D8 of the present invention, the combustion chambers 3; 4, 33; 44 illustrated are structured to communicate therebetween through the gas passage space S2, this structure is not limitative. For example, the combustion chambers may be so structured as to be mutually closed up by fitting the ring partition plate around the Inside of the outer cylinder. In the structure wherein the combustion chambers 3; 4, 33; 44 communicate with each other, the high temperature gas generated in each of the combustion chambers can be led into the other combustion chamber through the gas passage space S2 and the filters, to burn the gas generants packed therein.

While in the illustrated gas generators D1–D8, the two upper and lower combustion chambers are formed by a single ring partition plate, the present invention may alternatively adopt the structure that multi-level combustion chambers are formed by using two or more ring partition plates. In this alternative, a multistage controlled expansion and inflation of the airbag can be provided by the ignitor device being mounted in the multi-level combustion chambers, one in each combustion chamber.

Further, while in the illustrated gas generators D1–D8, the interior of the housing is partitioned into a plurality of combustion chambers, the present invention may alternatively adopt the structure that the interior of the housing is in the form of a single combustion chamber, rather than being partitioned, and a plurality of ignitor device is used for igniting and burning the gas generants. In this alternative, one or two or more ignitor devices are mounted in the combustion chambers in such a manner as to be offset from the axis of the housing.

Industrial Applicability

The gas generator of the present invention enables the airbag to be smoothly expanded and inflated instantaneously by the gas uniformly discharged from all around the housing without any partial expansion and inflation, thus enabling the airbag to serve its original function.

What is claimed is:

1. A gas generator, comprising:
a cylindrical housing;
gas generants packed in the housing to generate gas by combustion;
a plurality of ignitor devices for spouting flames into the housing to burn the gas generants packed in the housing, at least one of the ignitor devices is eccentrically disposed with respect to an axis of the housing; and
at least one enhancer device for allowing the flame of the at least one eccentrically disposed ignitor device to be propagated circumferentially and radially of the housing,
wherein the at least one enhancer device is provided extending circumferentially and radially in the housing, and
wherein the at least one enhancer device is disposed above the gas generants and is in direct or indirect contact with the gas generants in the combustion chamber.

2. A gas generator, comprising:
a cylindrical housing;
gas generants packed in a plurality of combustion chambers partitioned in the housing to generate gas by combustion;
a plurality of ignitor devices for spouting flames into the plurality of combustion chambers respectively to burn the gas generants packed in the plurality of combustion chambers respectively, at least one of the ignitor devices is eccentrically disposed with respect to an axis of the housing; and
at least one enhancer device for allowing the flame of the at least one eccentrically disposed ignitor device to be propagated circumferentially and radially of the housing,
wherein the at least one enhancer device is provided extending circumferentially and radially in the respective combustion chamber having the at least one eccentrically disposed ignitor device, and
wherein the at least one enhancer device is disposed above the gas generants and is in direct or indirect contact with the gas generants in the respective combustion chamber.

3. The gas generator according to claim 2, wherein the at least one enhancer device comprises an enhancing space opening in the combustion chamber and extending circumferentially and radially of the housing, the flames from the ignitor device to be spouted thereinto.

4. The gas generator according to claim 3, wherein the enhancing space is closed by a cushioning member, and the cushioning member has a plurality of enhancing holes.

5. The gas generator according to claim 1 or 2, wherein the at least one enhancer device comprises an enhancer agent containing an auto-ignition explosive composition.

6. The gas generator according to claim 2, wherein the respective combustion chamber is partitioned into upper and lower chambers.

7. The gas generator according to claim 3, wherein the at least one enhancer device further comprises an enhancer agent.

8. A gas generator, comprising:
a cylindrical housing;
gas generants packed in the housing to generate gas by combustion;
a plurality of ignitor devices for spouting flames into the housing to burn the gas generants packed in the housing, at least one of the ignitor devices is eccentrically disposed with respect to an axis of the housing; and
at least one enhancer device for allowing the flame of the at least one eccentrically disposed ignitor device to be propagated circumferentially and radially of the housing,
wherein the at least one enhancer device comprises an enhancing space opening in the housing and is provided extending circumferentially and radially of the housing.

9. A gas generator, comprising:
a cylindrical housing;
gas generants packed in a plurality of combustion chambers partitioned in the housing to generate gas by combustion;
a plurality of ignitor devices for spouting flames into the plurality of combustion chambers respectively to burn the gas generants packed in the plurality of combustion chambers respectively, at least one of the ignitor devices is eccentrically disposed with respect to an axis of the housing; and at least one enhancer device for allowing the flame of the at least one eccentrically disposed ignitor device to be propagated circumferentially and radially of the housing, wherein the at least one enhancer device comprises an enhancing space opening in the respective combustion chamber and is provided extending circumferentially and radially of the housing.

10. The gas generator according to claim 9, wherein;

the at least one enhancer device is in direct or indirect contact with the gas generants in the respective combustion chamber, and the at least one enhancer device is disposed so as to receive the flames spouted from a respective ignitor device of the plurality of ignitor devices.

11. The gas generator according to claim 9, wherein the enhancing space is closed by a cushioning member; and the cushioning member has a plurality of enhancing holes.

12. The gas generator according to claim 9, wherein the respective combustion chamber is partitioned into upper and lower chambers.

13. The gas generator according to claim 8 or 9, wherein the at least one enhancer device further comprises an enhancer agent.

14. The gas generator according to claim 13, wherein the enhancer agent contains an auto-ignition explosive composition.

* * * * *